March 1, 1955 E. A. WILCKENS ET AL 2,703,130
CAP ASSEMBLING APPARATUS
Filed Dec. 7, 1949 25 Sheets-Sheet 6

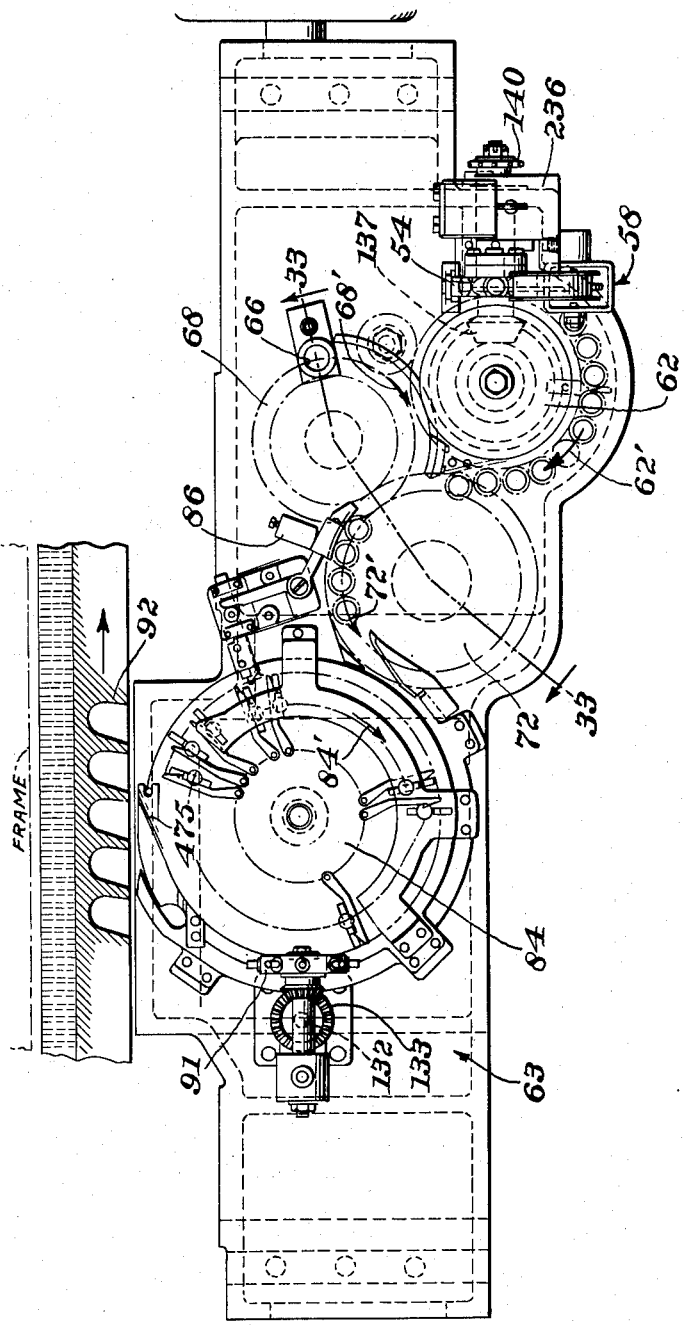

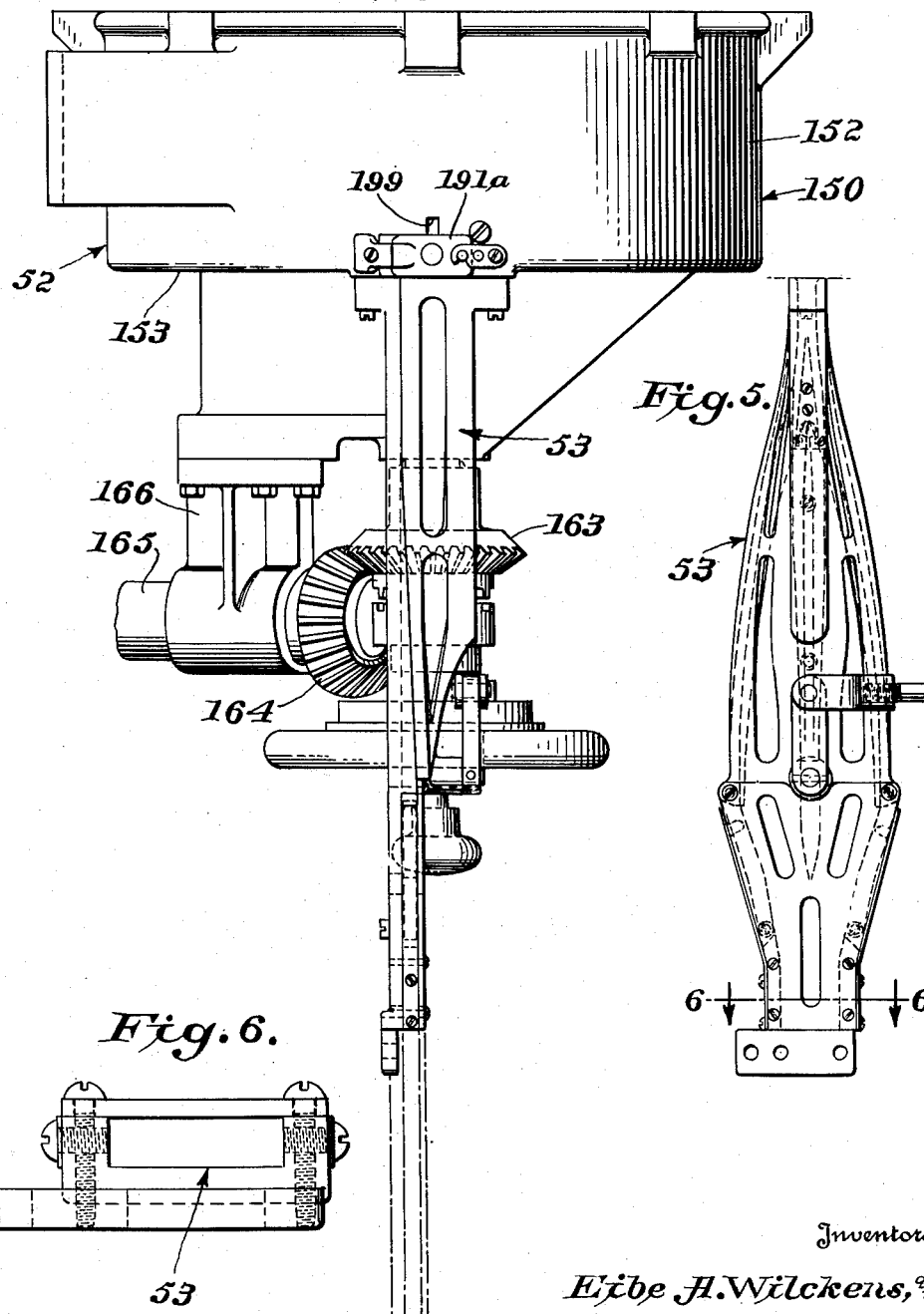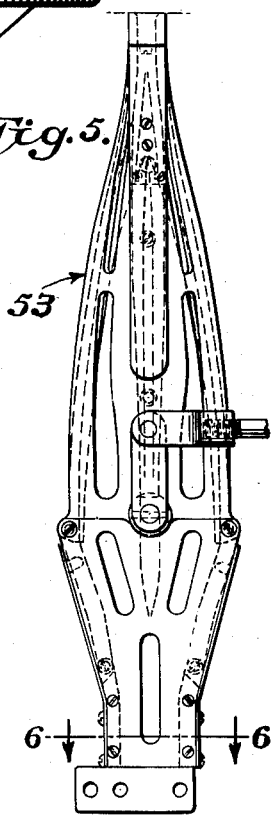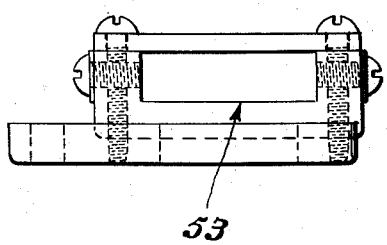

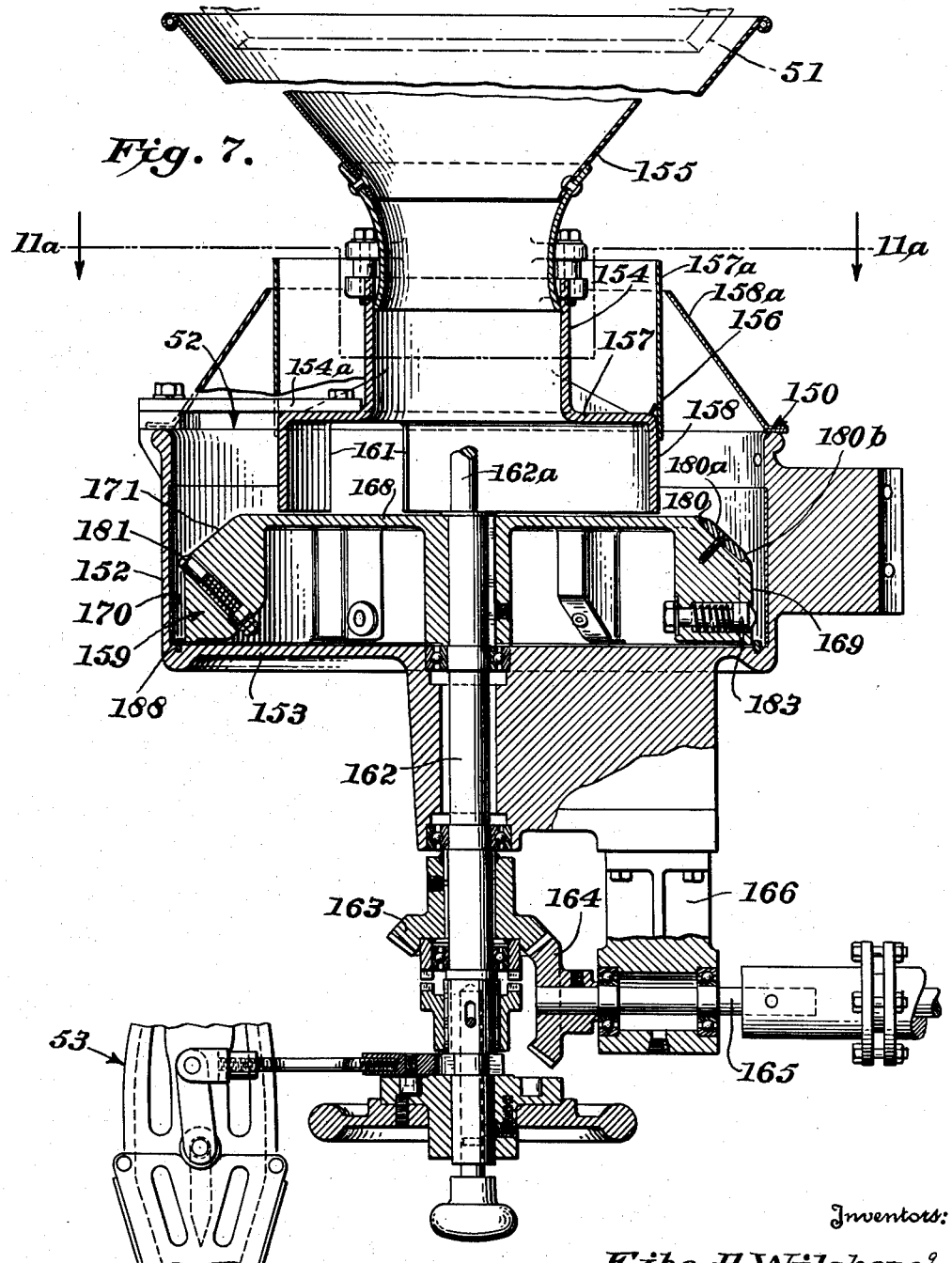

Inventors:
Eibe A. Wilckens,
Harry A. Rau,
By Cushman, Darby & Cushman
Attorneys.

March 1, 1955  E. A. WILCKENS ET AL  2,703,130
CAP ASSEMBLING APPARATUS
Filed Dec. 7, 1949  25 Sheets-Sheet 7
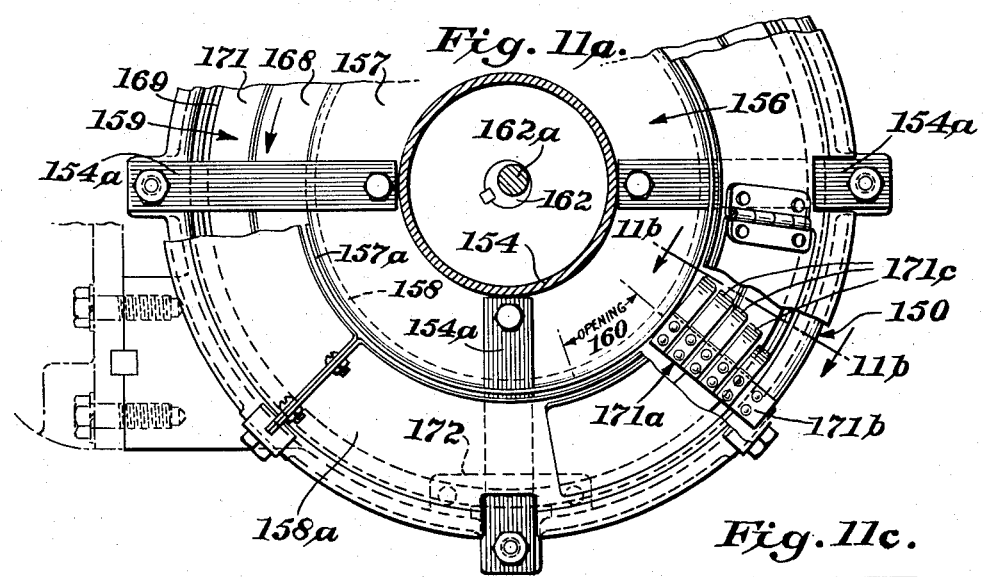
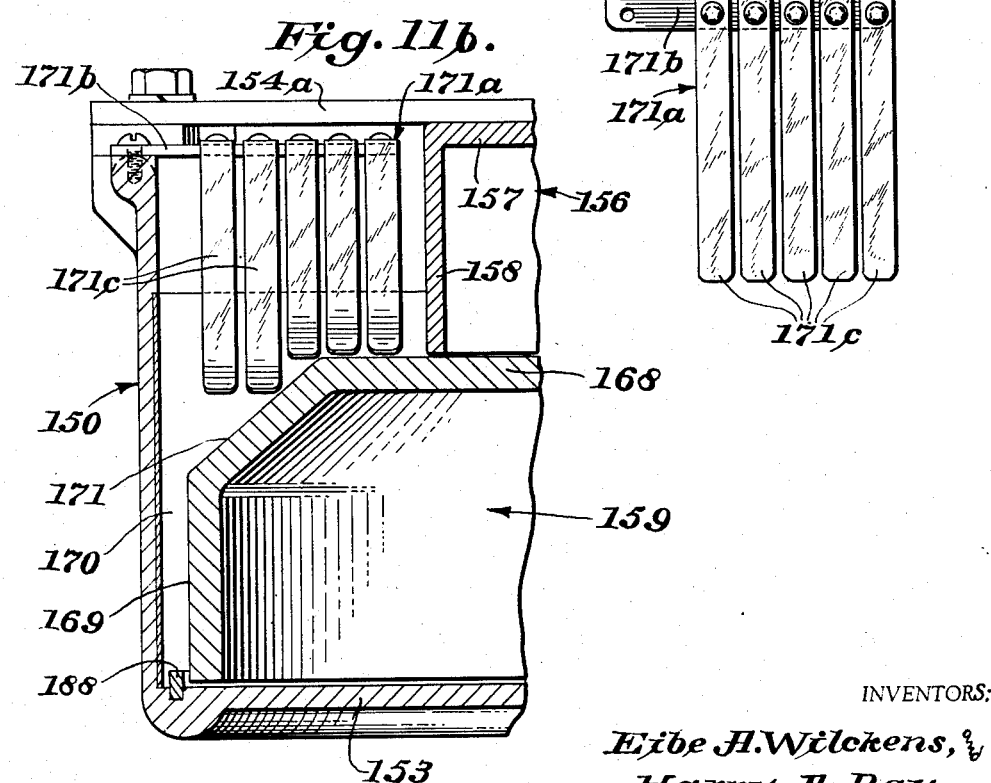
INVENTORS:
Eibe A. Wilckens,
Harry A. Rau,
BY
ATTORNEYS.

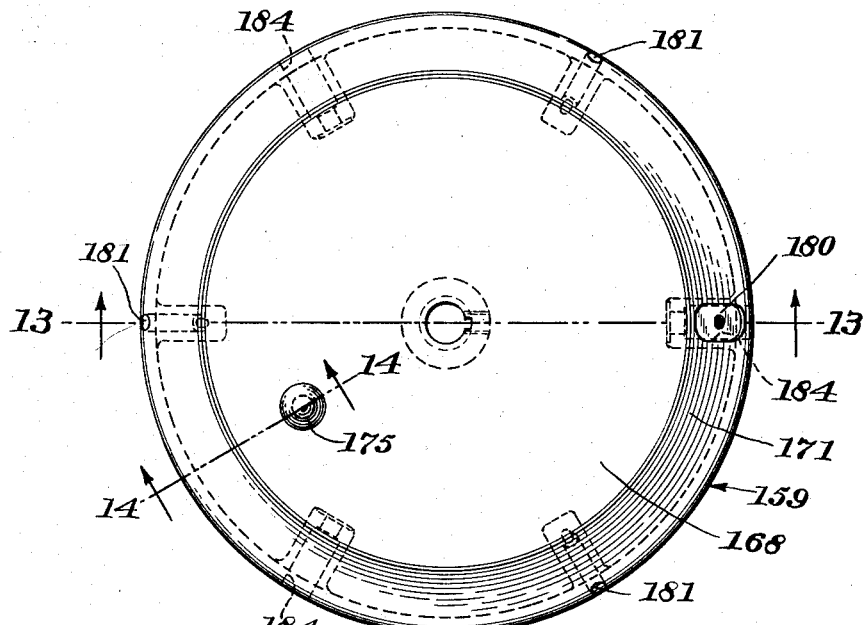
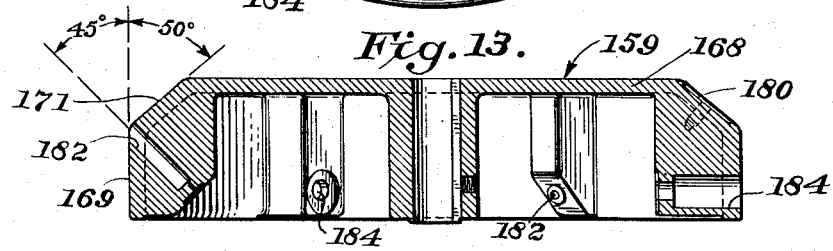
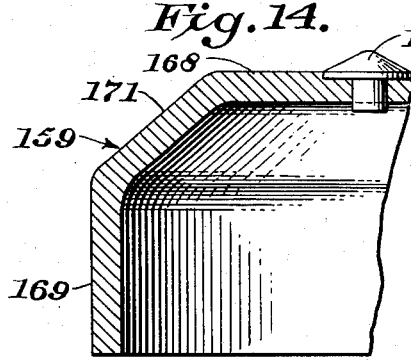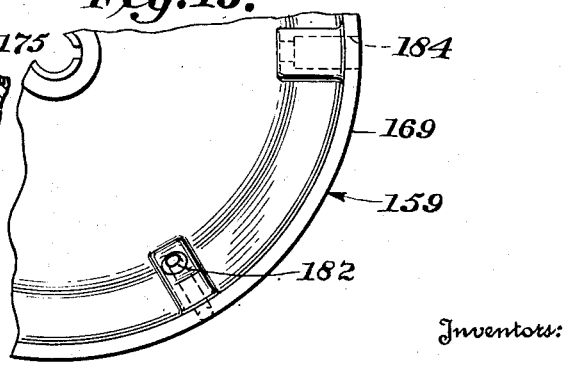

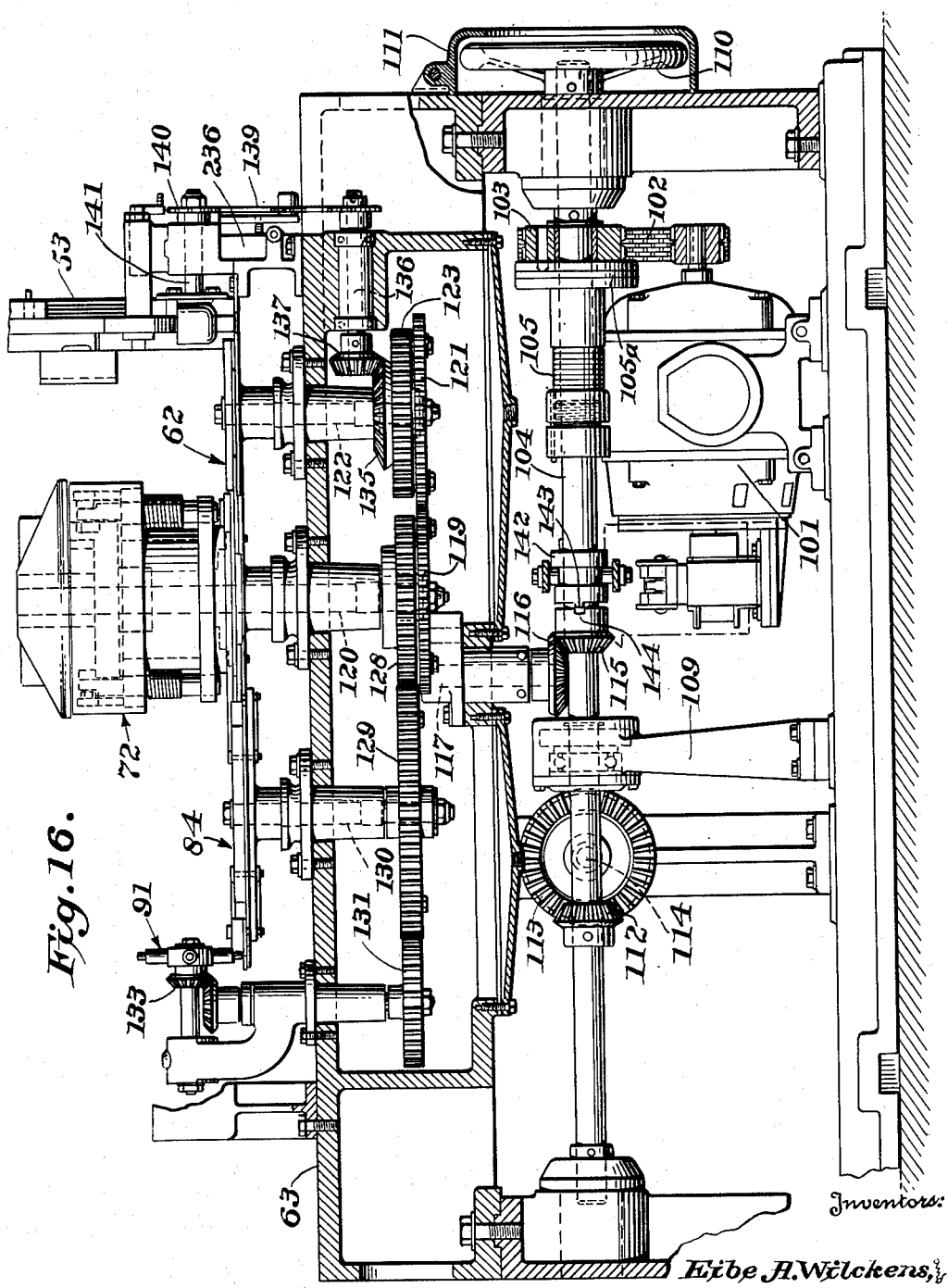

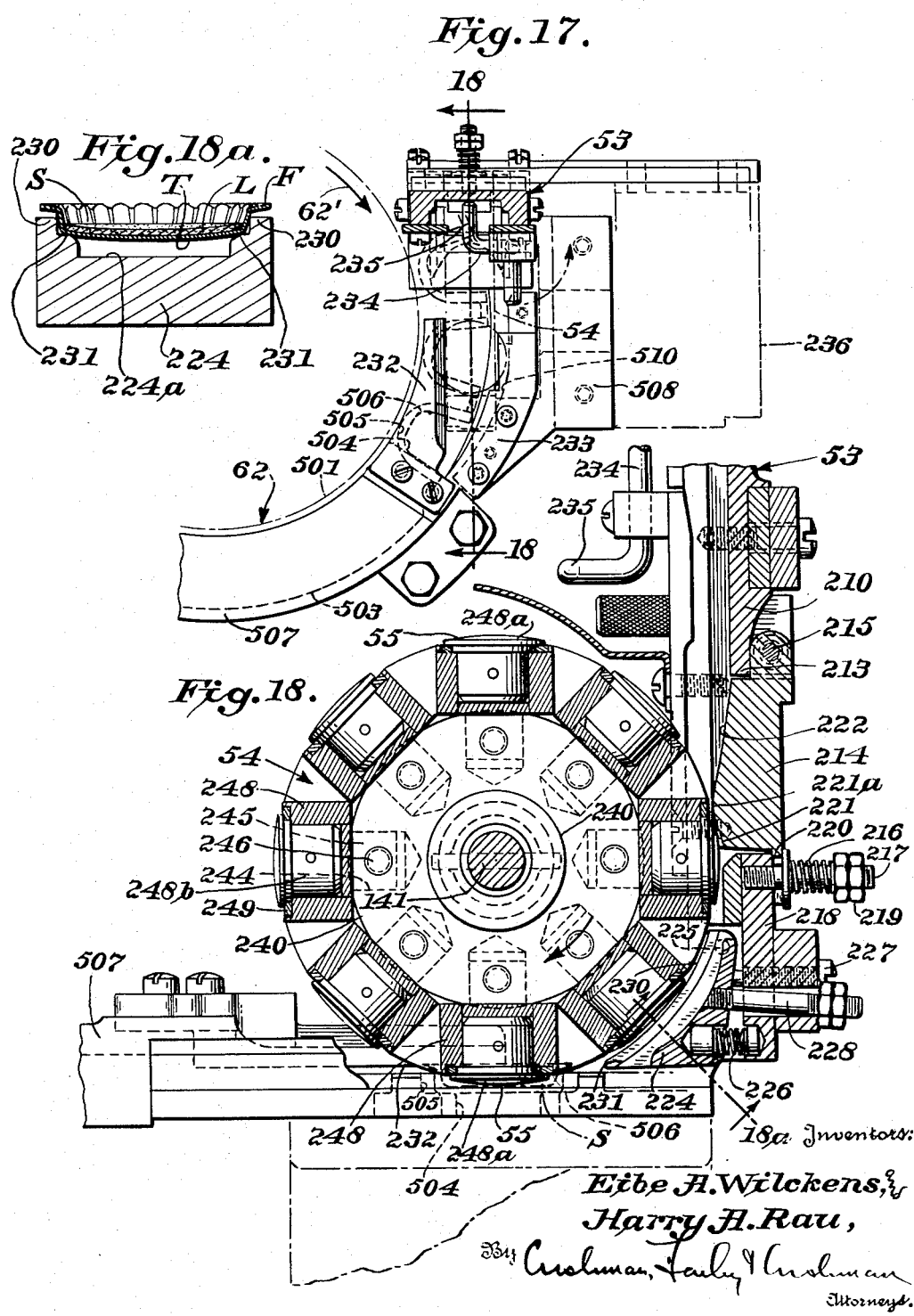

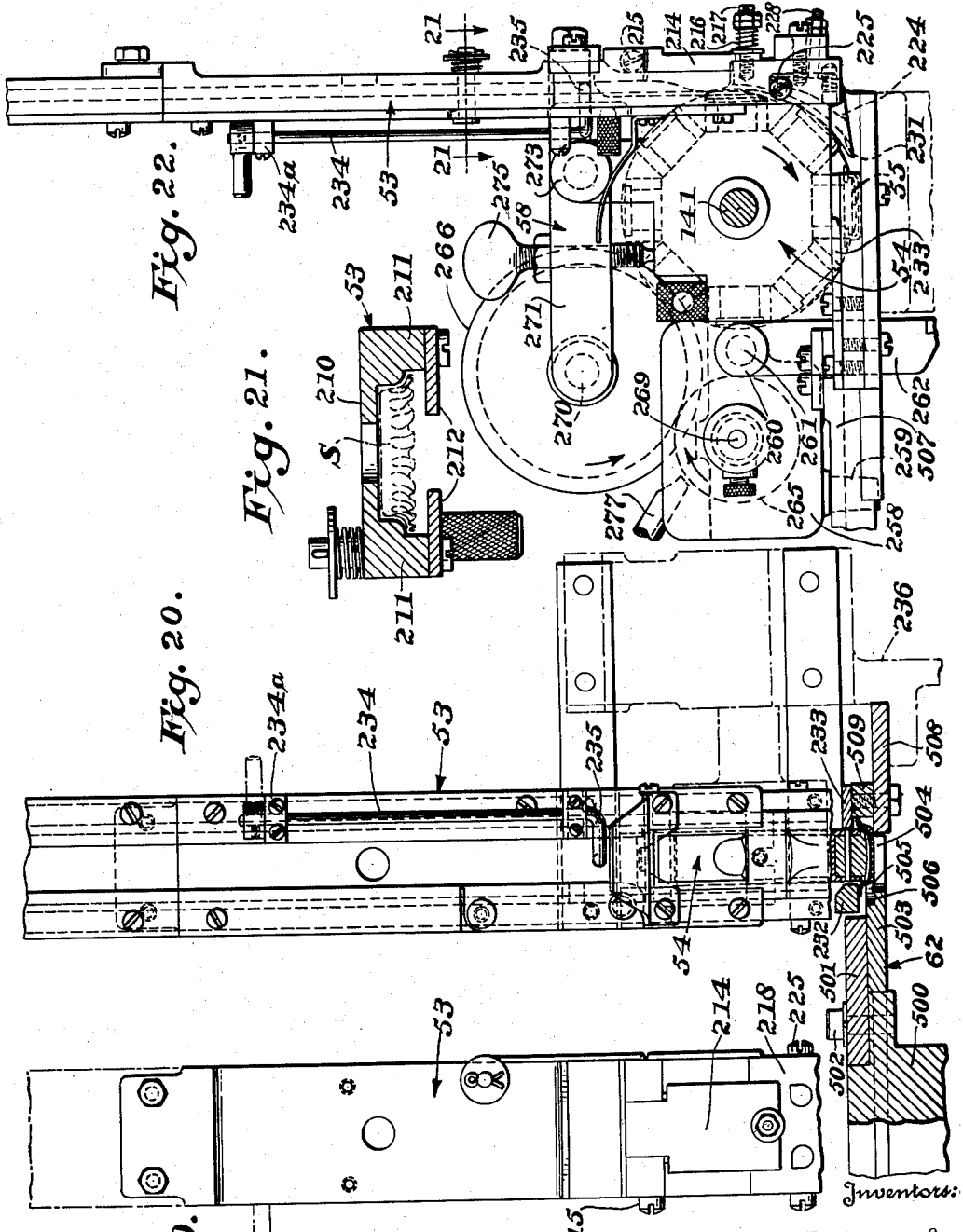

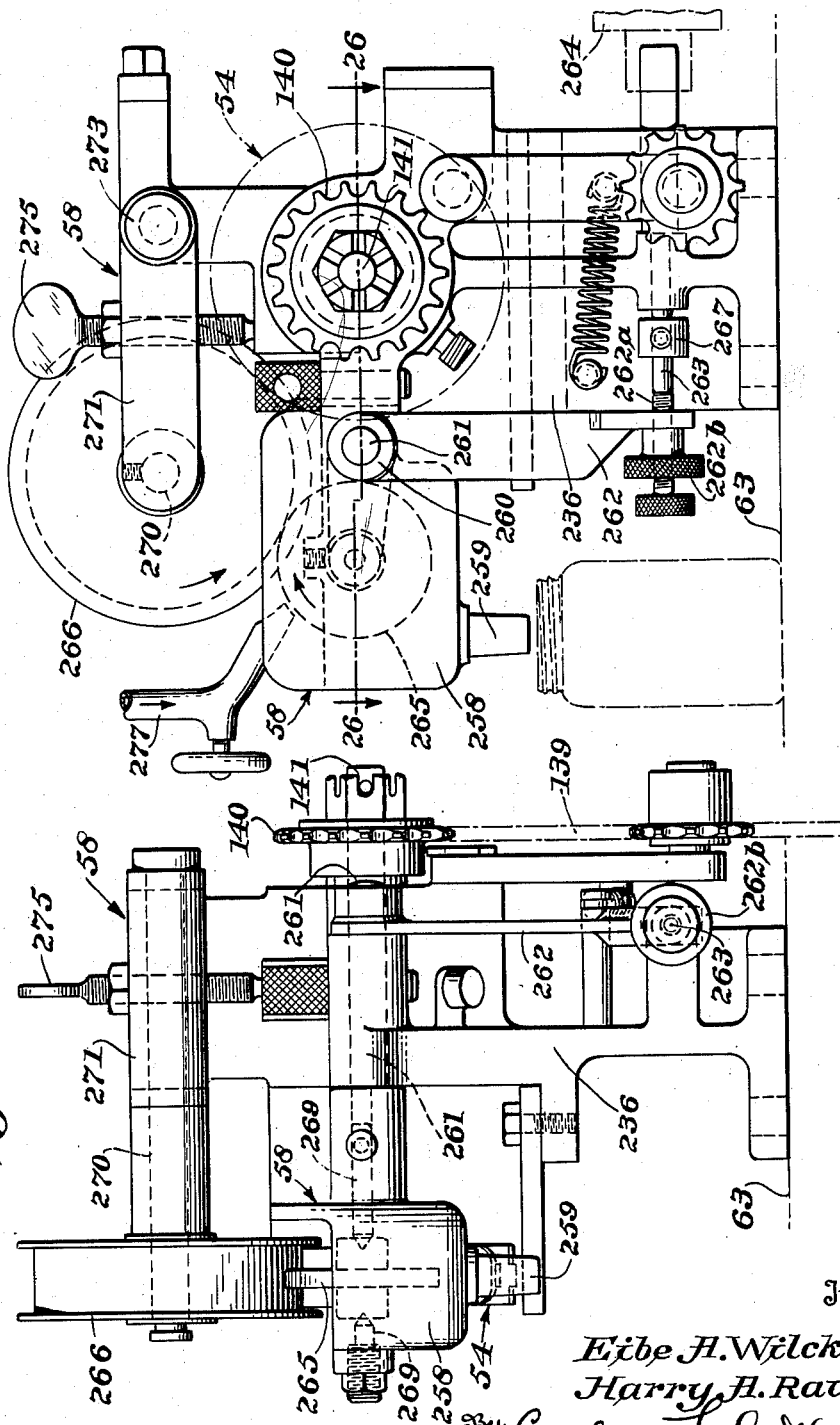

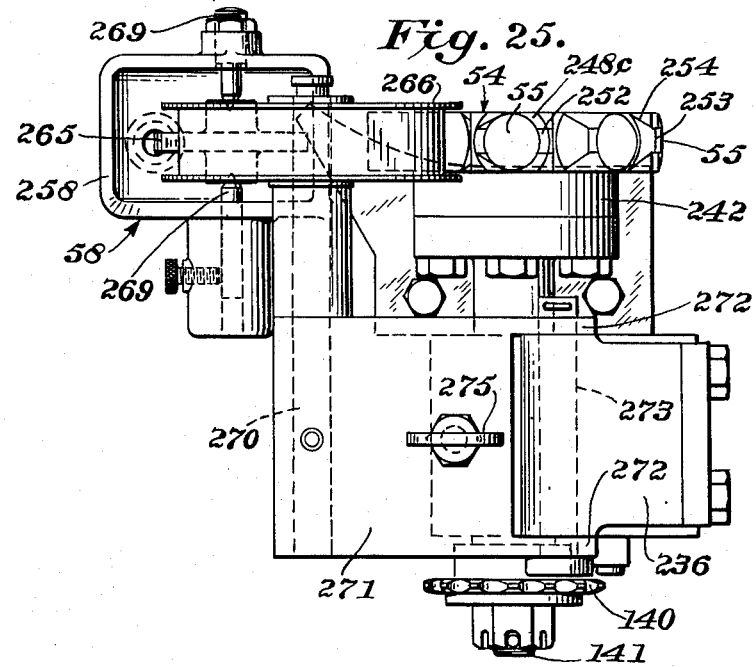
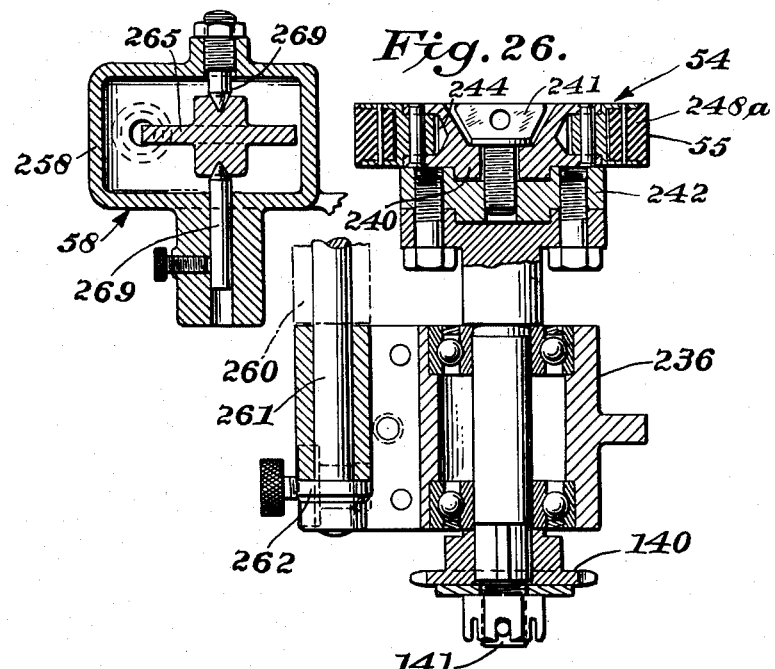

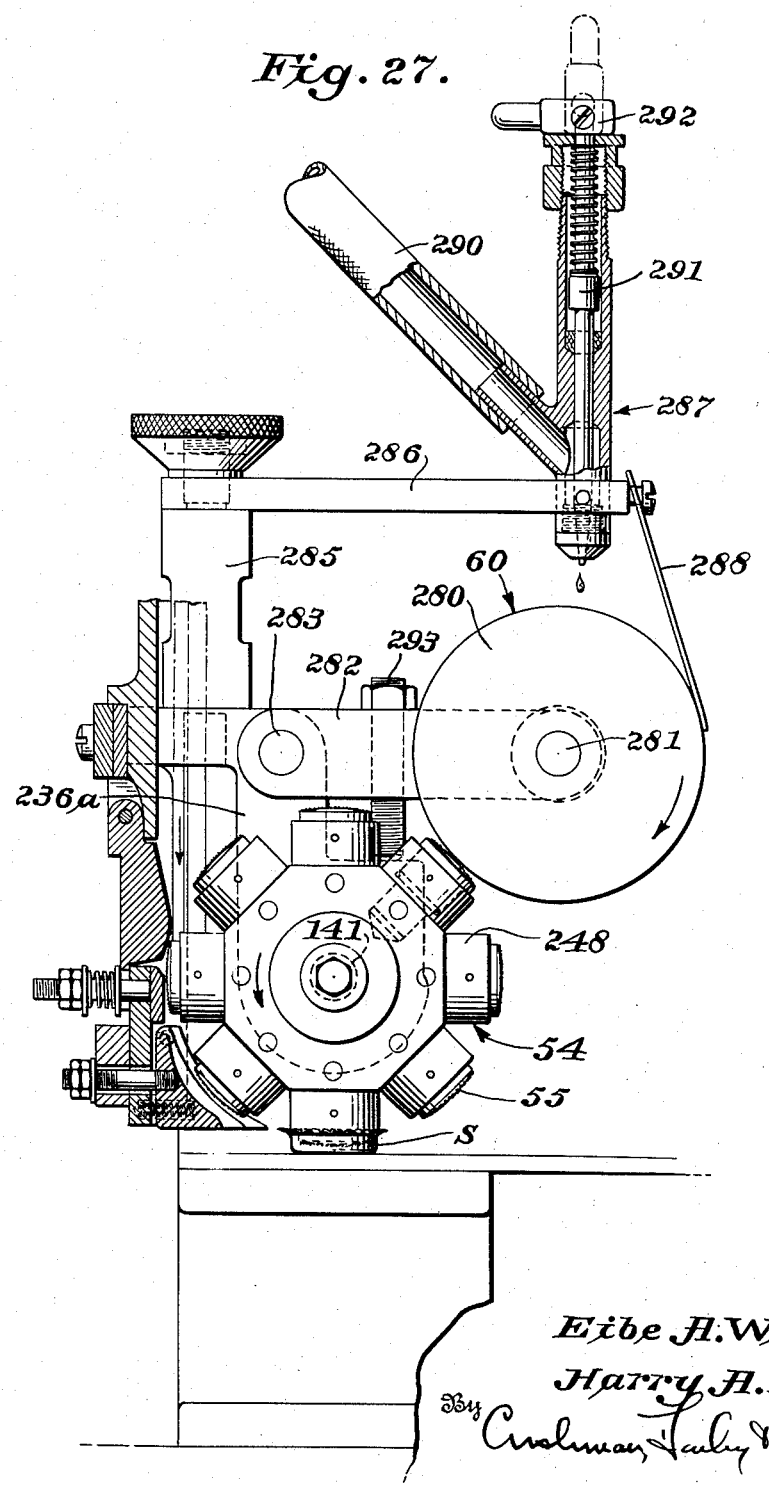

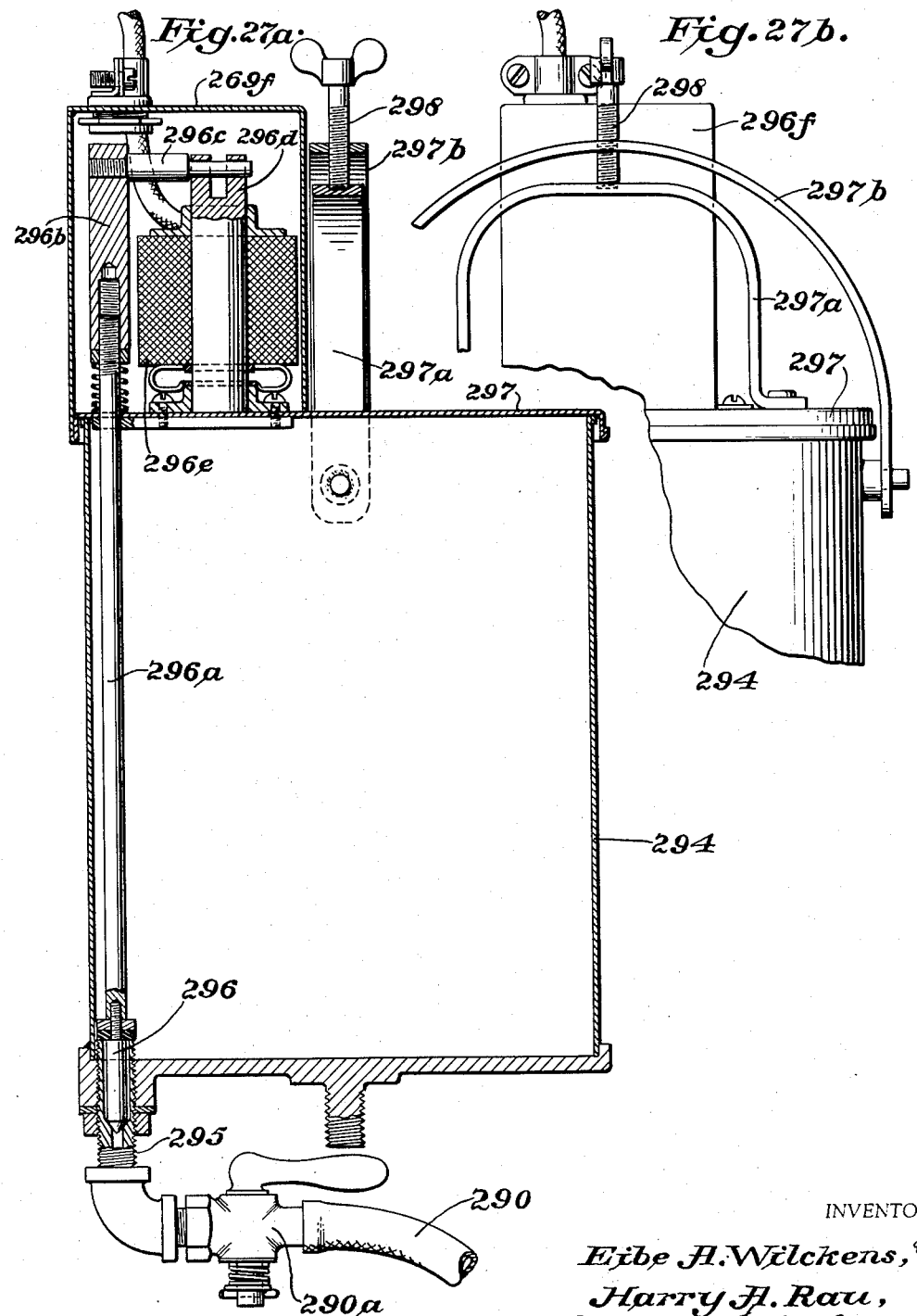

March 1, 1955  E. A. WILCKENS ET AL  2,703,130
CAP ASSEMBLING APPARATUS
Filed Dec. 7, 1949  25 Sheets-Sheet 16
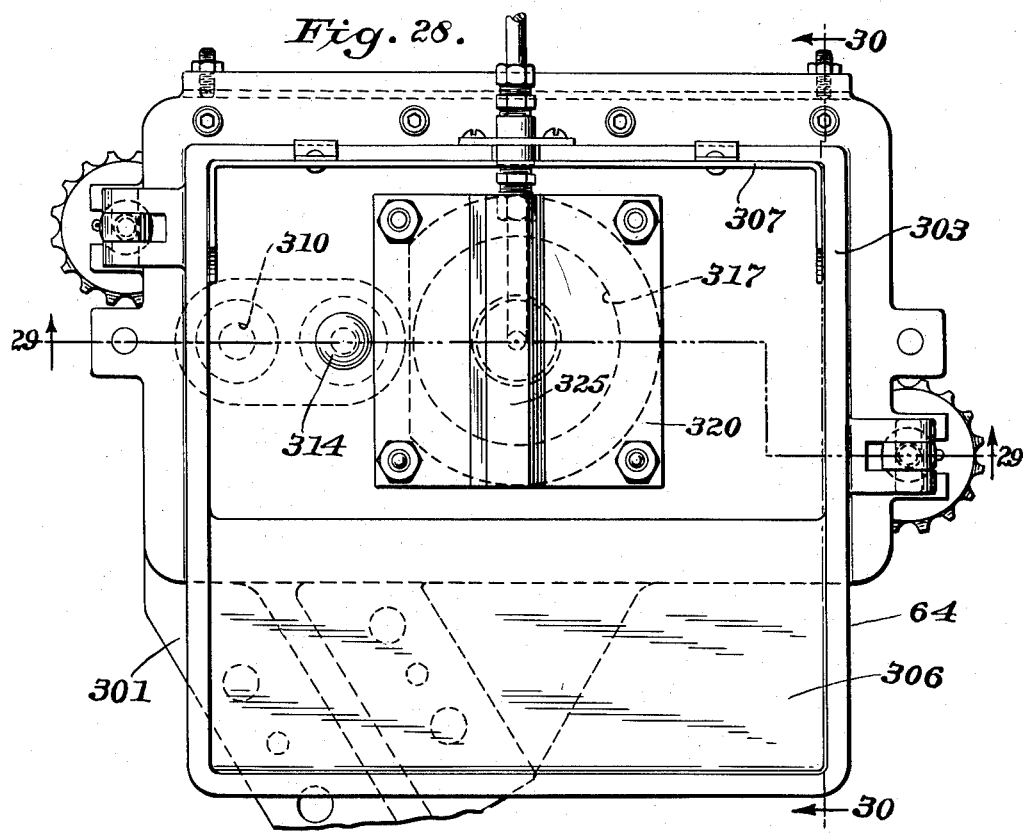
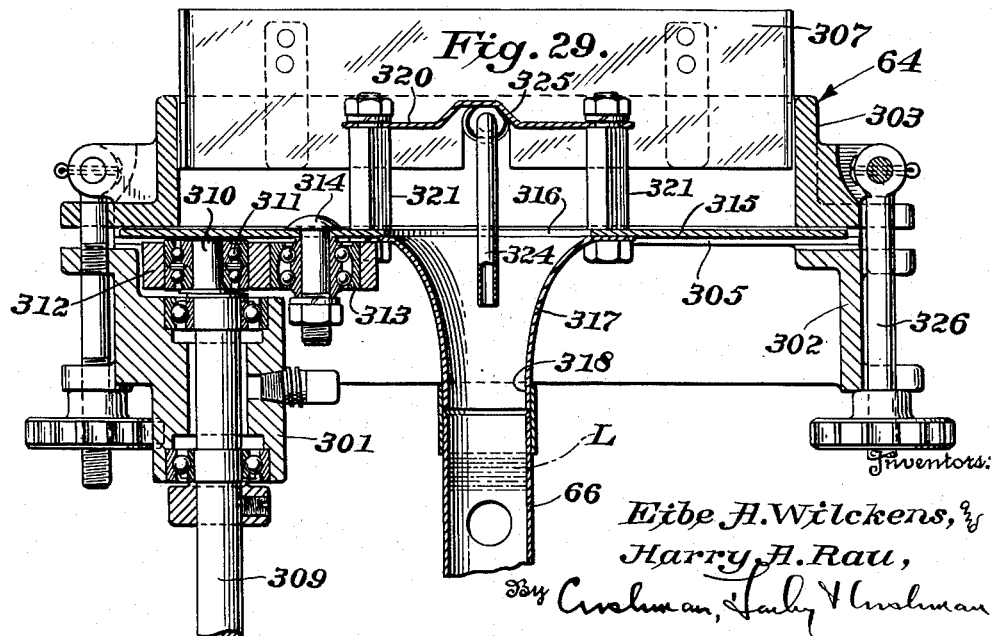

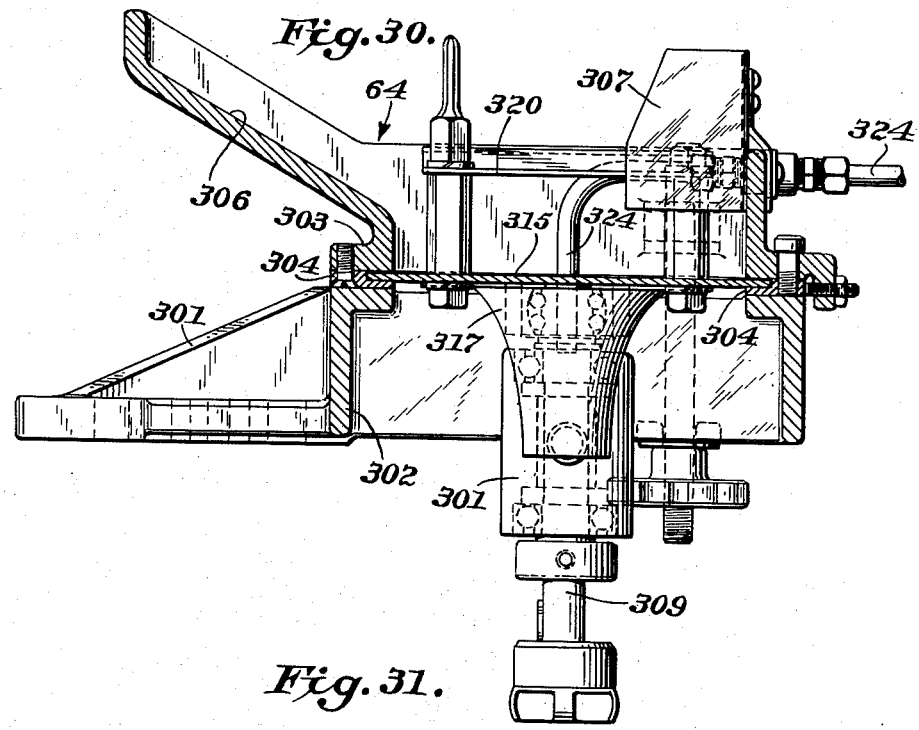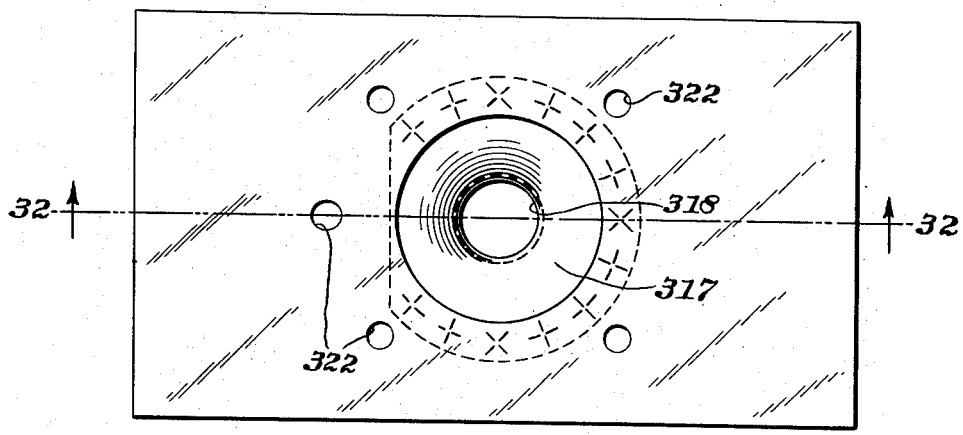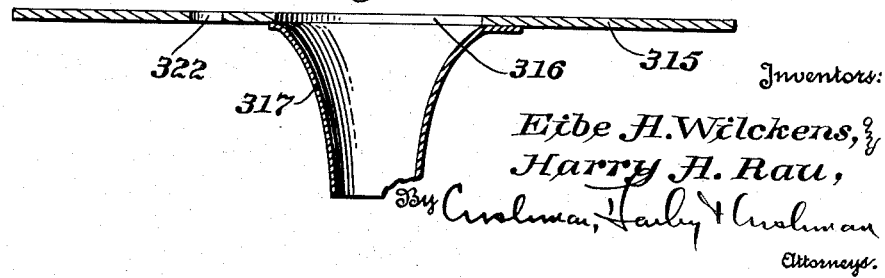

March 1, 1955

E. A. WILCKENS ET AL 2,703,130

CAP ASSEMBLING APPARATUS

Filed Dec. 7, 1949

Inventors:
Eibe H. Wilckens,
Harry H. Rau,
By Cushman, Darby & Cushman
Attorneys.

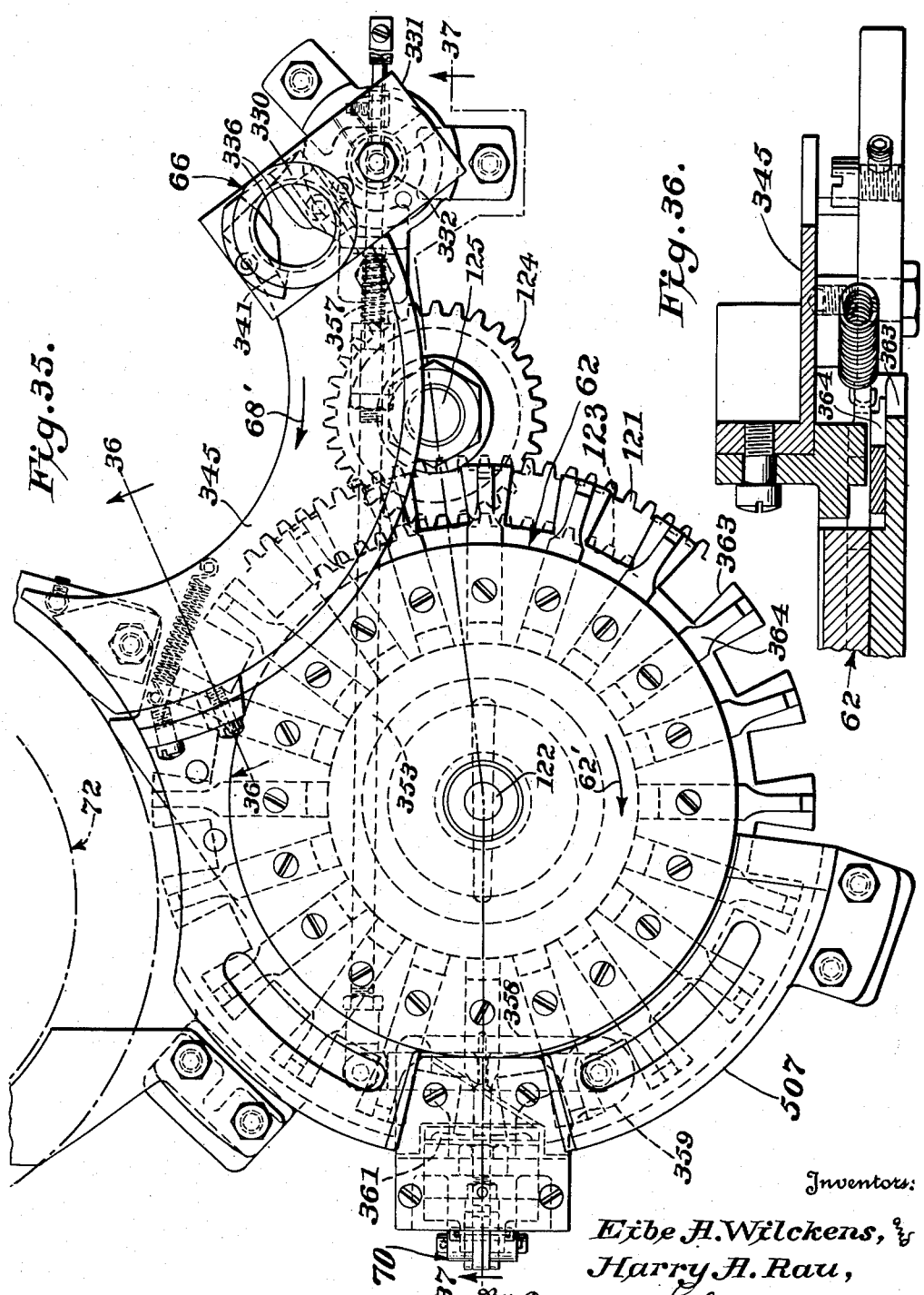

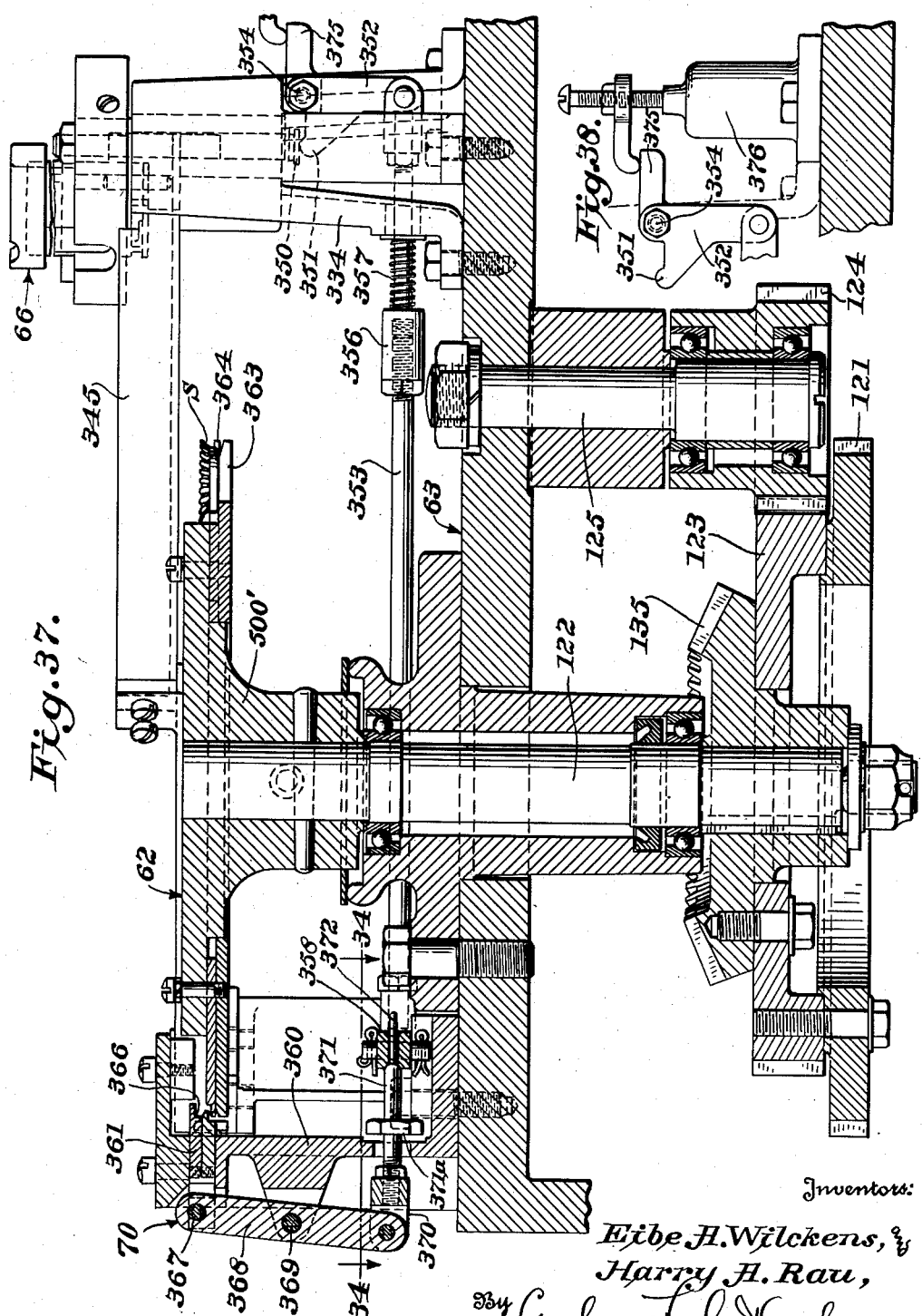

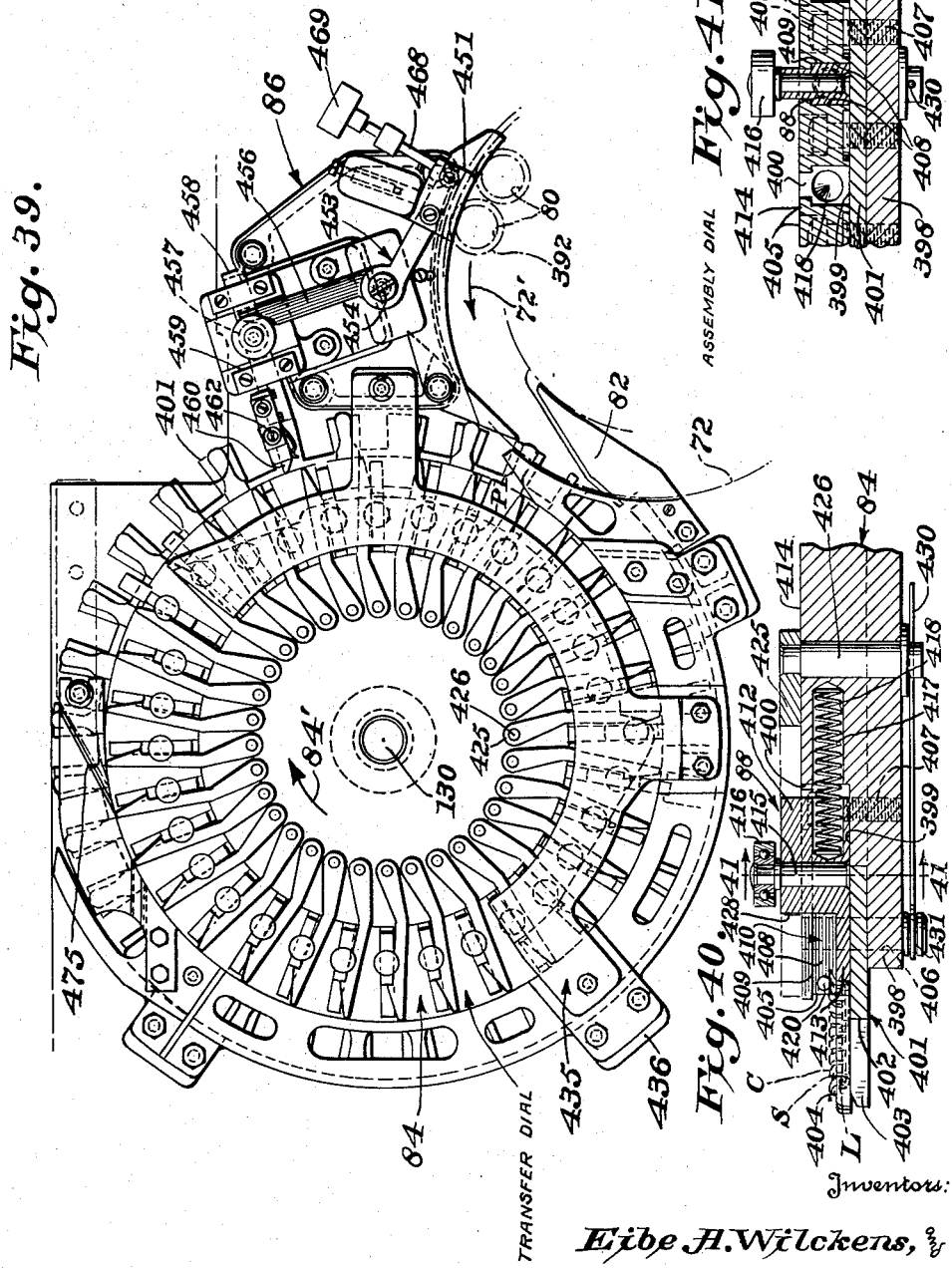

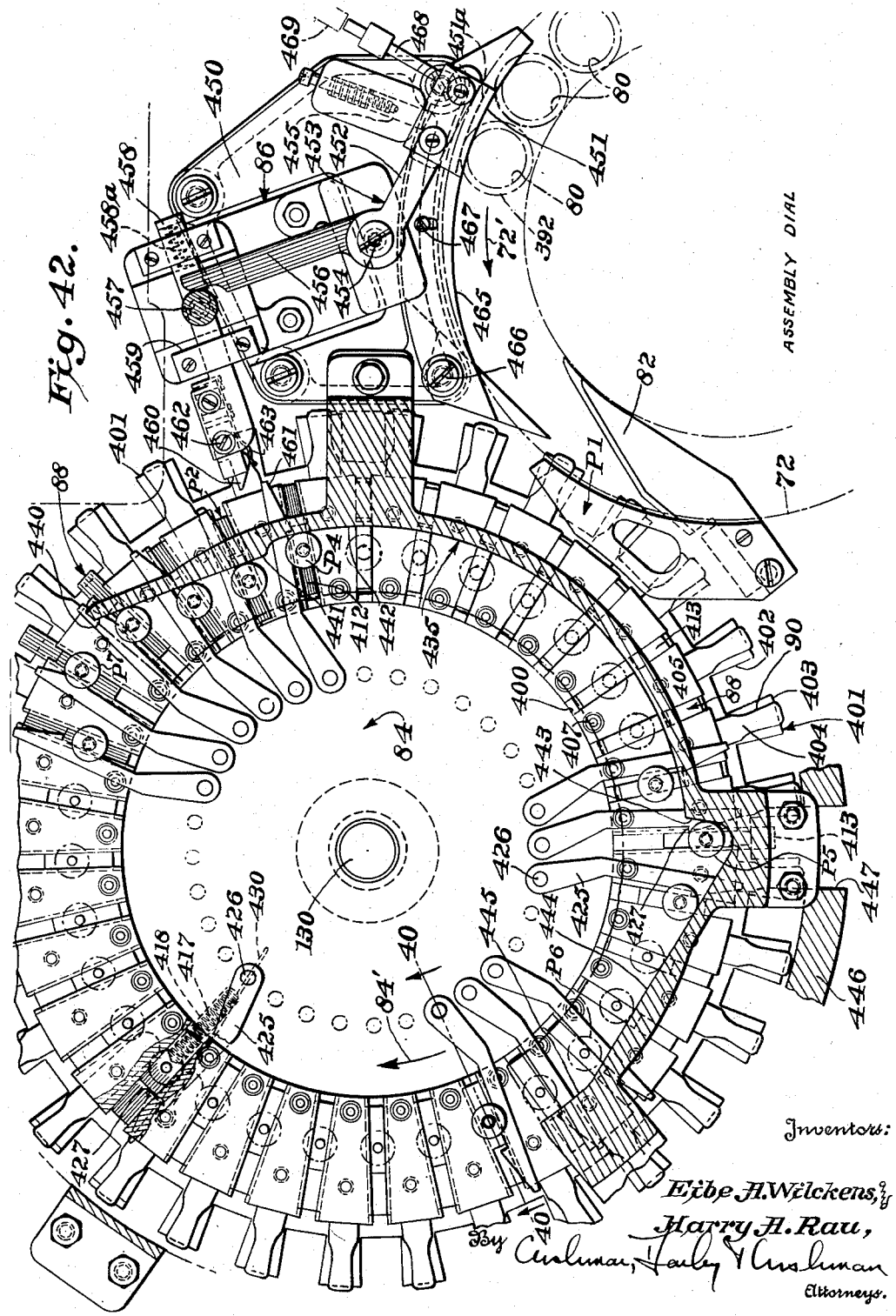

March 1, 1955    E. A. WILCKENS ET AL    2,703,130
CAP ASSEMBLING APPARATUS

Filed Dec. 7, 1949    25 Sheets-Sheet 23

Inventors:
Eibe A. Wilckens,
Harry A. Rau,
By Cushman, Darby & Cushman
Attorneys.

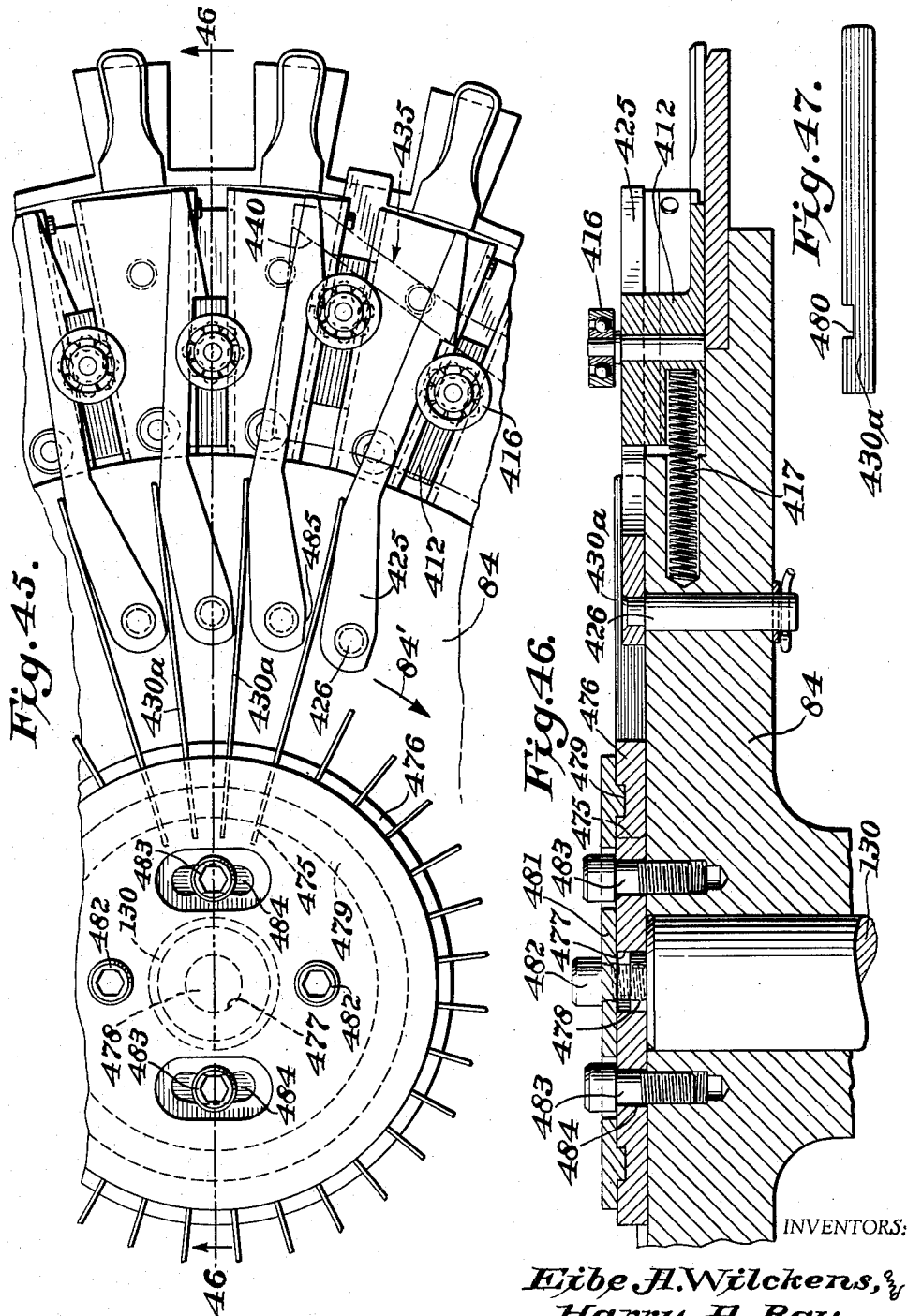

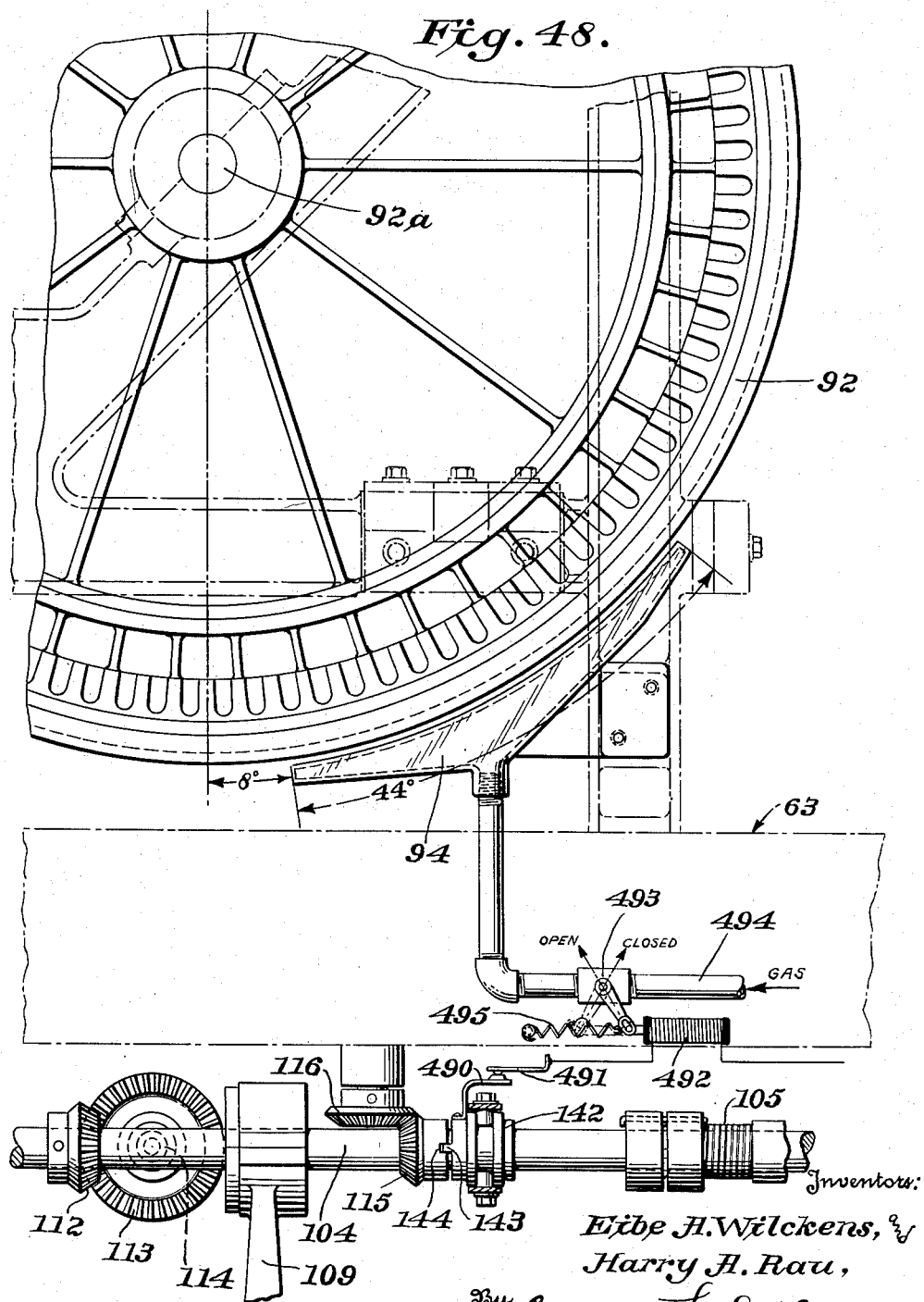

United States Patent Office 2,703,130
Patented Mar. 1, 1955

2,703,130

CAP ASSEMBLING APPARATUS

Eibe A. Wilckens and Harry A. Rau, Baltimore, Md., assignors to Crown Cork & Seal Company, Inc., Baltimore, Md., a corporation of New York Application December 7, 1949, Serial No. 131,554

24 Claims. (Cl. 154—1.5)

The present invention relates to cap assembling apparatus and, more particularly, to an apparatus to assemble cap shells and cushion liners.

Many cap assembling machines now in use are of the type wherein the various elements for handling the cap parts move step-by-step rather than continuously. While step-by-step operation cannot achieve optimum output it has been necessary to use that system because shell or liner feeding devices and detectors of previous design have not been capable of satisfactory operation with cap part handling elements moving at the higher speeds possible with continuous movement.

One object of the invention is to provide a cap assembling apparatus of such design that the cap parts will be moved therethrough by continuous movement, thereby obtaining optimum ouput of assembled caps.

Another object of the invention is the provision of a shell feeding mechanism of such design that shells fed thereto will be rapidly arranged in single file for further handling by the apparatus.

Still another object is the provision of a liner feeding mechanism so constructed that it will stack a mass of liners in superposed relation with optimum speed.

A further object is to provide a mechanism so constructed as to be highly efficient in delivering shells in properly spaced relation to rapidly moving shell receiving elements.

A still further object of the invention is the provision of means to supply adhesive to rapidly moving shells.

Another object is the provision of means to reduce the supply of adhesive in the event the movement of cap parts is interrupted.

An additional object of the invention is to provide a cap assembling apparatus including mechanism operable with a high-speed machine to prevent the feeding of a liner upon failure of the machine to feed a shell to receive such liner.

Another object is to provide mechanism suitable for use with a high-speed machine and to avoid delivery from the machine of a shell which lacks a liner therein.

Other objects and advantages of the invention will be apparent from the following specification and attached drawings wherein, Figure 1 is a side elevation of a cap assembling machine.

Figure 3 is a plan view of the Figure 1 machine with parts removed and with various elements shown in horizontal section.

Figure 4 is an elevation of a portion of a shell feeding mechanism.

Figure 5 is a view of a rectifier chute taken at right angles to the Figure 4 showing.

Figure 6 is a detail horizontal section on the line 6—6 of Figure 5.

Figure 7 is a vertical sectional view of the shell feeding mechanism.

Figure 11a is a horizontal sectional view on the line 11a—11a of Figure 7.

Figure 11b is a detail vertical section on the line 11b—11b of Figure 11a.

Figure 11c is a detail view of a shell retarder provided in the shell feeding means.

Figure 12 is a top plan view of a shell feeding drum included in the Figure 7 mechanism.

Figure 13 is a vertical section on the line 13—13 of Figure 12.

Figure 14 is an enlarged vertical sectional view on the line 14—14 of Figure 12.

Figure 15 is a fragmentary bottom view of the Figure 12 drum.

Figure 16 is a vertical sectional view of the lower portion of the machine, the view looking toward Figure 3 from the lower edge of the latter figure and with the near casing wall removed.

Figure 17 is a fragmentary view of a device for delivering shells to the machine, the view generally looking downwardly upon the Figure 18 structure but showing the shell feeding and adhesive applying wheel of the latter figure in dot and dash lines.

Figure 18 is a vertical sectional view on the line 18—18 of Figure 17 and including the shell feeding and adhesive applying wheel. The view in on a larger scale than Figure 17.

Figure 18a is a detail section on the line 18a of Figure 18.

Figure 19 is an elevation looking toward Figure 22 from the right.

Figure 20 is an elevation looking toward Figure 22 from the left but with parts omitted.

Figure 21 is an enlarged horizontal sectional view on the line 21—21 of Figure 22.

Figure 22 is a side elevation of the shell delivering and adhesive applying mechanism. The view is taken looking toward Figure 18 from the right.

Figure 23 is an elevation of the adhesive supply arrangement included in the Figure 24 device, the view looking toward the latter figure from the left.

Figure 24 is an elevation of the adhesive supply mechanism of Figure 23, the view being taken looking toward Figure 23 from the right.

Figure 25 is a top plan view of the Figure 24 structure.

Figure 26 is a horizontal sectional view on the line 26—26 of Figure 24.

Figure 27 is an elevation with parts in vertical section, the view showing the shell delivering mechanism of Figure 18 provided with a second form of adhesive supply.

Figure 27a is a vertical section through an adhesive supply tank.

Figure 27b is a fragmentary elevation of the Figure 27a structure as viewed from the right of the latter figure.

Figure 28 is a top plan view of a liner disk supply mechanism.

Figure 29 is a horizontal sectionl view on the offset line 29—29 of Figure 28.

Figure 30 is a vertical sectional view on the line 30—30 of Figure 28.

Figure 31 is a top plan view of the liner shaking plate included in the structure of Figures 28 to 30.

Figure 32 is a vertical sectional view on the line 32—32 of Figure 31.

Figure 35 is a top plan view of the shell feeding dial and illustrates the position of that dial with respect to the liner feeding dial. The view omits the shell feeding wheel.

Figure 36 is a detail vertical section on the line 36—36 of Figure 35.

Figure 37 is a vertical sectional view on the angled line 37—37 of Figure 35.

Figure 38 is a fragmentary elevation illustrating a detail of the mechanisms of Figures 35 and 37.

Figure 39 is a top plan view of a shell ejector mechanism and showing the relation of the transfer dial of that mechanism to the assembly dial.

Figure 40 is a transverse section on the line 40—40 of Figure 42.

Figure 41 is a transverse section on the line 41—41 of Figure 40.

Figure 42 is a view of the Figure 39 structure but with parts shown in horizontal section.

Figure 45 is a fragmentary elevation showing a modified form of shell ejector mechanism.

Figure 46 is a section on the line 46—46 of Figure 45.

Figure 47 is a detail view of a latch spring provided in the structure of Figures 45 and 46, and Figure 48 is a diagrammatic view showing an arrangement for controlling the gas supply to a heating burner associated with the pressure dial.

General construction and operation

Figure 1:
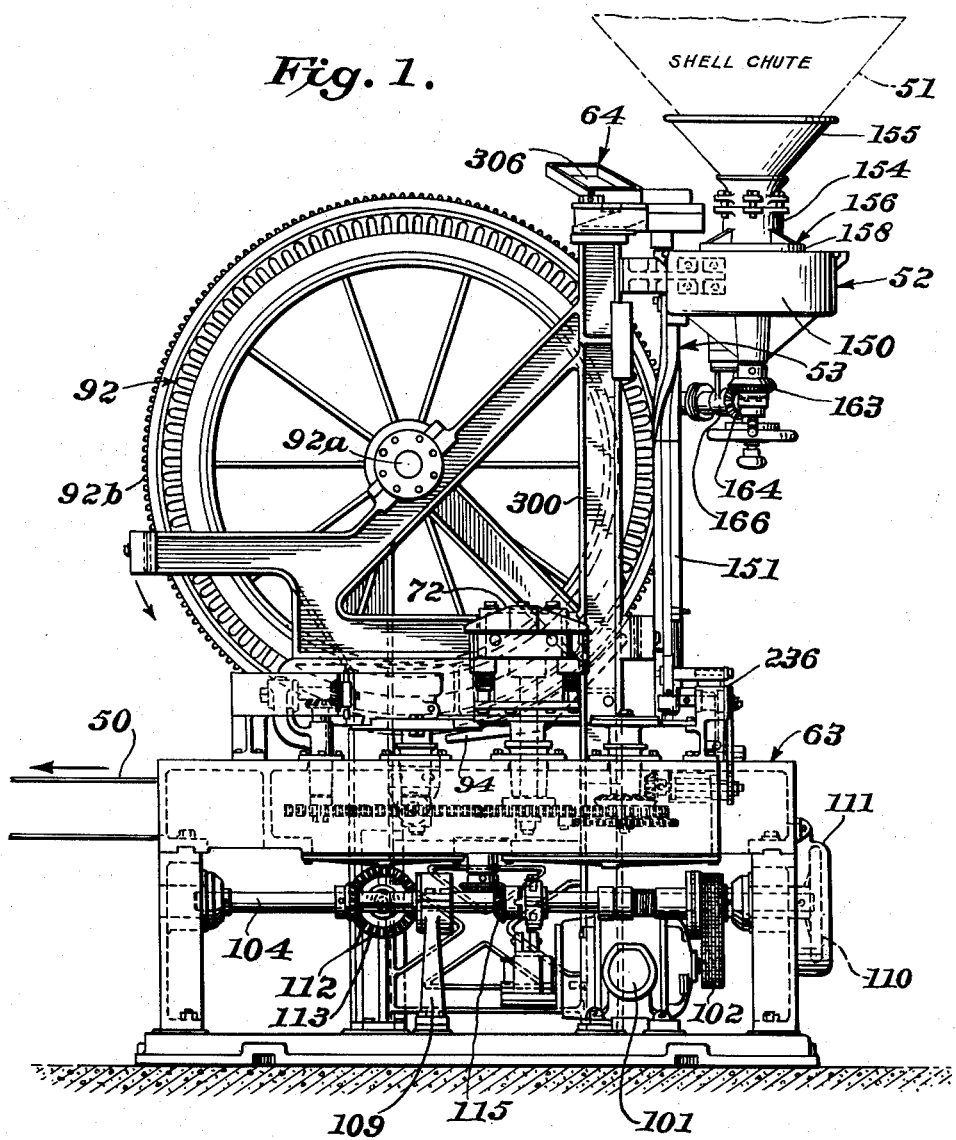

The machine illustrated in the drawings is intended for assembly of crown-type bottle caps. As is shown in Figure 40, such caps C comprise a metal shell S and a liner L, the liner usually being formed of a cork disc.

Figure 2:
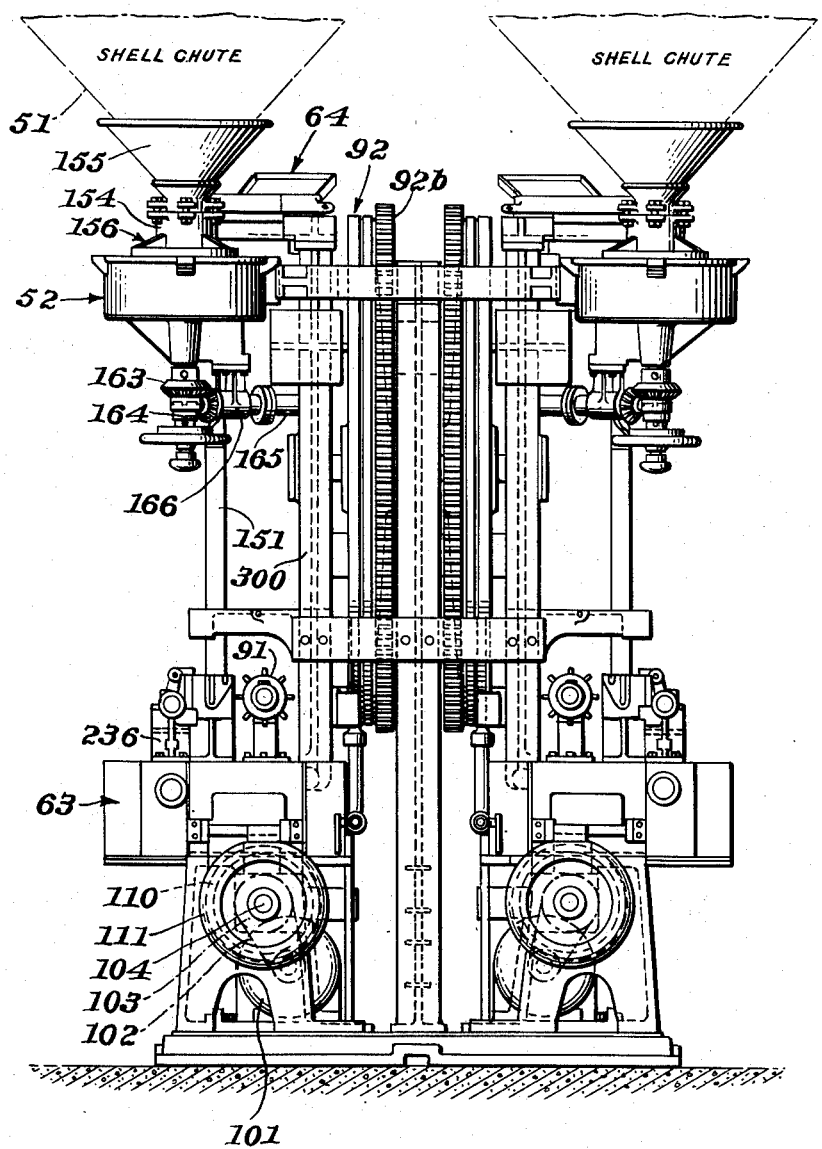
Figure 2 is a front elevation of the Figure 1 machine, i. e., a view looking toward Figure 1 from the right and showing a pair of the machines of Figure 1.

The construction and operation of the embodiments of the invention disclosed herein may be generally described as follows: As is indicated in Figures 1 and 2, two machines such as discosed herein are usually arranged side by side so that the caps assembled thereon can be delivered to a single outfeed conveyor 50 extending between the pair of machines and moving toward the left in Figure 1. The two machines are identical except for such changes as enable them to face in opposite directions and, therefore, only the left-hand machine of Figure 2 is hereinafter described.

Shells S are delivered to the machine from a source including the chute outlets 51 shown in the upper portion of Figures 1 and 2, the shells falling from chute 51 into the shell feeding mechanism 52 illustrated in Figures 4 to 15. The shells move downwardly from feeding mechanism 52 in single file by way of a chute 53. Chute 53 includes a rectifier and delivers properly facing shells to a shell delivery wheel 54 shown in Figures 18, 24, 25 and 27. Wheel 54 is provided with a series of circumferentially spaced pads 55 which engage the shells S to withdraw them from the lower and curved bottom end of chute 53 and simultaneously apply adhesive to the inner surface of the top wall of each shell. Figures 22 to 26 illustrate one form of adhesive supply device 58 and Figures 27 to 27b illustrate a second form 60. Each of the adhesive supply devices includes means to stop supply of adhesive when the feed of shells is interrupted.

The shell delivery wheel 54 positions the shells in pockets of a shell feeding dial 62 indicated in Figures 3 and 16 and shown in more detail in Figures 35 and 37. Dial 62 rotates in a horizontal plane above the table 63 of the machine.

Liners L are delivered to the machine from a suitable source to fall into a liner feeding device 64 (Figures 28 to 32) from which the liners move into a liner stack tube 66 wherein they lie in superposed relation. As is shown in Figures 35 and 37, liners L are removed from the lower end of the stacking device 66 by a liner feeding dial 68. Liner feeding dial 68 rotates in a horizontal plane above table 63 and a detector mechanism generally designated 70 is provided to lift the lower section of liner stack 66 out of the path of dial 68 in the event that the corresponding pocket of shell feeding dial 62 does not receive a shell from the shell delivery wheel 54.

Figure 33:
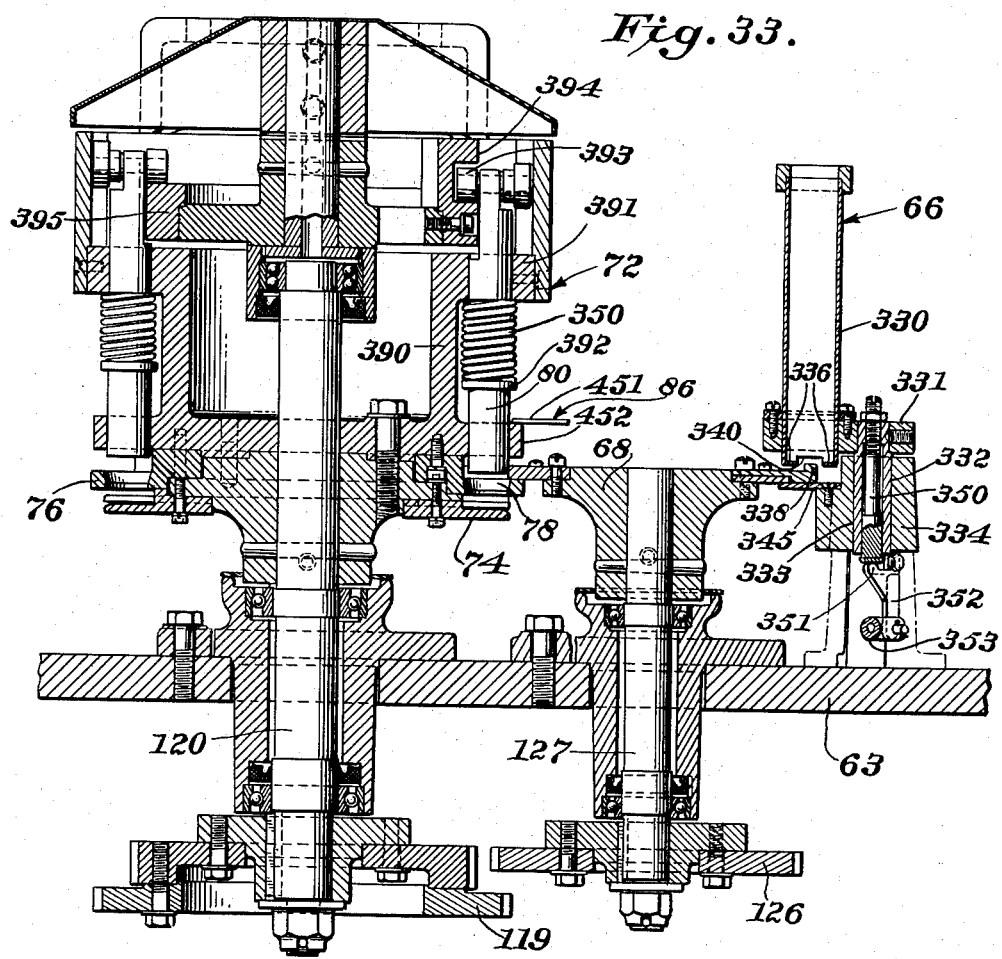
Figure 33 is a vertical sectional view on the angled line 33—33 of Figure 3.

As is best indicated in Figure 3, the shell feeding dial 62 and the liner feeding dial 68 respectively deliver shells S and liners L to an assembly dial 72 rotatable above table 63, the axes of these three dials being vertical and arranged at the apices of a tiangle. As is indicated in Figure 33, assembly dial 72 includes a lower table or flange 74 upon which the shell feeding dial 62 will deposit shells S, and an upper flange 76 to receive liners L from the liner feeding dial 68. The upper flange 76 is provided with a circumferential series of tapered apertures 78, and liner feeding dial 68 positions the liners L upon flange 76 in alignment with these apertures so that the liners may drop into the apertures. The shells S are placed on the lower flange 74 of assembly dial 72 in alignment with the apertures 78. A series of plungers 80 included in the assembly dial mechanism are reciprocated in the apertures 78 to force the liners downwardly through the apertures 78 and into the shells S.

The caps formed by assembly of the shells S and the liners L are stripped from the lower flange of the assembly dial by a fixed stripper plate 82 shown in Figures 39 and 42. Stripper plate 82 moves the now assembled caps C into pockets of a transfer dial 84.

As is illustrated in Figures 39 to 46, assembly dial 72 has a detector 86 associated therewith which controls the action of ejectors 88 associated with the respective pockets 90 of the transfer dial 84. Detector 86 controls the action of ejectors 88 in such a manner that whenever a shell S delivered to assembly dial 72 by a shell feeding dial 62 fails to receive a liner L from liner feeding dial 68, such shell will be ejected from its pocket 90 on the transfer dial 84 by the corresponding ejector 88.

A wax applying device 91 may apply wax or other suitable coating to the liners L while the latter and their shells S are moving upon transfer dial 84.

Assembled caps C move from the transfer dial 84 to a presser dial 92 of the type disclosed in John D. Elder Patent No. 2,342,621, issued February 21, 1944. The presser dial is generally illustrated in Figures 1 to 3 and 48 of the present case. As is shown in those figures, the presser dial rotates in a vertical plane. As is described in said Elder patent, the presser dial includes cam controlled spring-pressed plungers which exert pressure to firmly press the liners L into the shells S during setting of the adhesive. As is illustrated in Figure 48, a gas burner 94 will be positioned adjacent the presser dial to heat the latter to thereby activate the adhesive, and means is provided to stop the flow of gas to burner 94 when the drive for the dials other than presser dial 92 is discontinued, and regardless of whether presser dial 92 is still driven.

The detailed construction and operation of each of the devices and mechanisms outlined above are hereinafter described in detail.

Drive mechanism

As is best shown in Figure 16, the machine is driven by a motor 101 through a sprocket chain 102, which sprocket chain engages a sprocket wheel 103 rotatable upon horizontal shaft 104. Sprocket wheel has one element of a friction clutch 105a fixed thereto, the other element of the clutch being keyed on shaft 104. A spring 105 having one end fixed to shaft 104 urges the clutch elements into engagement but absorbs starting shock and prevents damage to the machine in the event of a cap jam in the machine. Shaft 104 is the main drive shaft of the machine and is suitably journalled in the lower portion of the base or table 63 as well as in a support 109 intermediate its length. A hand wheel 110 is fixed to one end of shaft 104 to enable it to be rotated by hand during any adjustment of the machine. Cover plate 111 pivoted to table 63 normally encloses hand wheel 110.

A bevel gear 112 fixed to shaft 104 drives a bevel gear 113 fixed to a horizontal shaft 114. Shaft 114, by suitable gearing, not shown, drives the presser dial 92 which is journalled on a bearing 92a. The presser dial is provided with gear teeth 92b extending about its periphery and by means of which it is rotated.

Shaft 104 carries a bevel gear 115 which is loose for rotation on the shaft but held against axial movement. Gear 115 meshes with a bevel gear 116 fixed to a vertical shaft 117. Shaft 117 carries a pinion, not shown, at its upper end which meshes with a large gear 119 fixed to the shaft 120 which supports the rotatable elements of the assembly dial or mechanism 72 (Figure 33). The shell feeding dial 62 is driven from the gear 119 in that a large pinion 121 fixed to the shell feeding dial shaft 122 meshes with the large gear 119. A pinion 123 also fixed to the shaft 122 meshes with a small pinion 124 (Figure 35) journalled on a pin 125 fixed in table 63 and the pinion 124 drives a ring gear 126 fixed to the shaft 127 to which the liner feeding dial 68 is secured.

Referring to Figure 16, the shaft 120 of the assembly mechanism also has a pinion 128 fixed thereto which drives a gear 129 fixed to the shaft 130 of the transfer dial 84. Gear 129 also drives a pinion 131 secured to a vertical shaft 132 connected by suitable bevel gears generally designated 133 in Figures 3 and 16 to the wax supplying device.

The shell delivery wheel 54 and the adhesive supply device used therewith are driven from a bevel gear 135 which, as shown in the right hand portion of Figure 16, is fixed to the shell feeding dial shaft 122. A horizontal shaft 136 journalled in the side wall of the table 63 has a bevel gear 137 fixed to its inner end to engage the bevel gear 135. The outer end of shaft 136 carries a sprocket wheel to drive a chain 139 which extends in driving engagement about a sprocket wheel 140 fixed to the shaft 141 of the shell delivery wheel 54 as also shown in Figures 23 and 24. If desired, shaft 136 may drive shaft 141 through a gear train.

It will be observed that main drive shaft 104 drives all of the elements of the machine except presser dial 92 through bevel gear 115, and drives the presser dial through bevel gear 112. Because bevel gear 112 is fixed to shaft 104, presser dial 92 will be rotated whenever main drive shaft 104 is rotated. However, because gear 115 is loose on shaft 104, this gear and all of the elements except the presser dial 92 will only be driven when a movable clutch element 142 slidably keyed on shaft 104 is moved into engagement with a cooperating clutch element on gear 115. The engaging members of the clutch comprise a single tooth 143 and a recess 144. Provision of these members insures that when the clutch is engaged, the presser dial 92 will turn in properly timed relation with all of the other elements of the machine.

Shell feeding mechanism

The shell feeding mechanism 52 is illustrated in detail in Figures 4 to 15. As is shown in Figures 1 and 2, a bowl 150 included in this mechanism is supported from a post 300 which extends upwardly from the table 63 of the machine. Bowl 150 is of generally cylindrical form to comprise a circular side wall 152 and a bottom wall 153. As is shown in Figure 7, an infeed tube 154 fixed to the top edge of the bowl 150 by bars 154a includes an upper funnel portion 155 into which shells S are delivered from a bin, not shown, through an outlet 51. The lower end of tube 154 opens to a circular chamber 156 having an inside diameter of the order of ten inches and so positioned that its top wall 157 is substantially flush with the upper edge of bowl 150. A circular shield 157a is fixed to and extends upwardly from the outer surface of the sidewall or skirt 158 of chamber 156 to prevent shells from piling up upon the top of chamber 156. An inwardly inclined shield 158a fixed to the top edge of bowl 150 prevents shells from being thrown out of the bowl. The depending skirt 158 of chamber 156 extends downwardly into the bowl 150 to be closely adjacent the upper surface of a distributor drum 159 which is rotatable within the bowl as hereinafter described. The circular outline of the skirt 158 of chamber 156 is indicated by dot and dash lines in Figure 8, from which it will be observed that a portion of the skirt 158 is cut away to provide an outlet opening 160 which extends throughout the height of the skirt. The opening 160 has a width about three times greater than the overall diameter of a shell S. The height of the chamber 156 is slightly less than twice the overall diameter of a shell S so as to permit shells to readily stand on edge therein. Hence, it follows that the opening 160 is also of such height that a shell may move freely therethrough while standing on edge.

Bowl 150 has a shaft 162 journalled in its lower central portion and drum 159 is keyed to this shaft. Shaft 162 has a bevel gear 163 fixed thereto adapted to be driven by a bevel gear 164 fixed to a horizontal shaft 165 journalled in a downward extension 166 of bowl 150. Shaft 165 is driven by a separate motor, not shown, and which also drives the liner feeding device 64 as hereinafter described.

The drum 159 fixed to shaft 162 includes a top wall 168 lying in a horizontal plane and closely adjacent the lower edge of the skirt 158 of chamber 156. The drum 159 includes a vertical and peripheral wall 169 of such diameter that, throughout its circumference, it is spaced from a band 170 in bowl 150 by a distance slightly exceeding the height of a shell S, viz., the dimension of a shell measured from its top wall to the free end of its skirt. Band 170 is of hardened steel and is fixed in bowl 150 to form the inner peripheral surface of the latter. The inner surface of the band is highly polished to prevent scratching of shells moving along the same. As is best indicated in Figure 13, the top wall 168 and the vertical wall portion 169 of drum 159 are joined by an inclined wall portion 171 which lies at approximately 50° to the vertical wall portion 169.

As is best shown in Figure 11a, the outlet 160 of chamber 156 has a shell retarder or valve generally designated 171a associated therewith. Retarder 171a comprises a bar 171b having one end fixed to the upper edge of the bowl side wall 152, the bar projecting radially inwardly toward the upper portion of chamber 156. As is illustrated in Figure 11c, a number of resilient metal strips or fingers 171c have one end fixed to bar 171b. In use, the fingers 171c are bent downwardly to lie alongside a side edge of bar 171b and then they are bent forwardly so as to present a convex surface to shells moving with drum 156, i. e., moving in the direction of the arrow of Figure 11a.

As is apparent from Figures 11a and 11b, the fingers 171c are bent to varying extents, the fingers positioned immediately above the horizontal drum wall 168 being bent further upwardly than those which lie above the inclined wall 171 of the drum. However, the fingers above the surface 168 will lie closely adjacent but out of contact with surface 168 while those immediately above inclined wall 171 have their lower ends sufficiently spaced from wall 171 by a sufficient distance to permit a shell to move freely beneath them and with the drum. As is hereinafter explained, the resilient and readily bendable fingers 171c provide a means to determine the feeding of shells from chamber 156 and with drum 159. The operator can adjust the position of the fingers by hand to meet the requirements of the cap-assembling mechanism. The fingers are accessible through an opening in the shield 158a, the opening normally being closed by a pivoted cover 171d.

As is hereinafter described in detail, rotation of drum 159 will cause shells S to move beneath the fingers 171c in substantially single file and while standing between the drum wall 169 and the bowl lining band 170. The drum will move the thus-positioned shells to an outlet deflector 172 positioned above an outlet opening 173. In order to cause the shells to thus move with the drum 159, the latter is provided with suitable impelling means projecting from its various surfaces. One such impelling means is a conical projection 175 secured in an aperture in the top wall of the drum at such distance from the axis of the drum that the protuberance will rotate immediately adjacent and within the depending skirt 158 of chamber 156. It will be noted that because the protuberance 175 thus rotates within chamber 156 beneath a group of shells resting upon the drum and within chamber 156, the lower shells will be caused to rotate and thereby move in single file through the opening 160 and out upon the portion of the top wall of drum 159 which is outside chamber 156.

Figure 8:
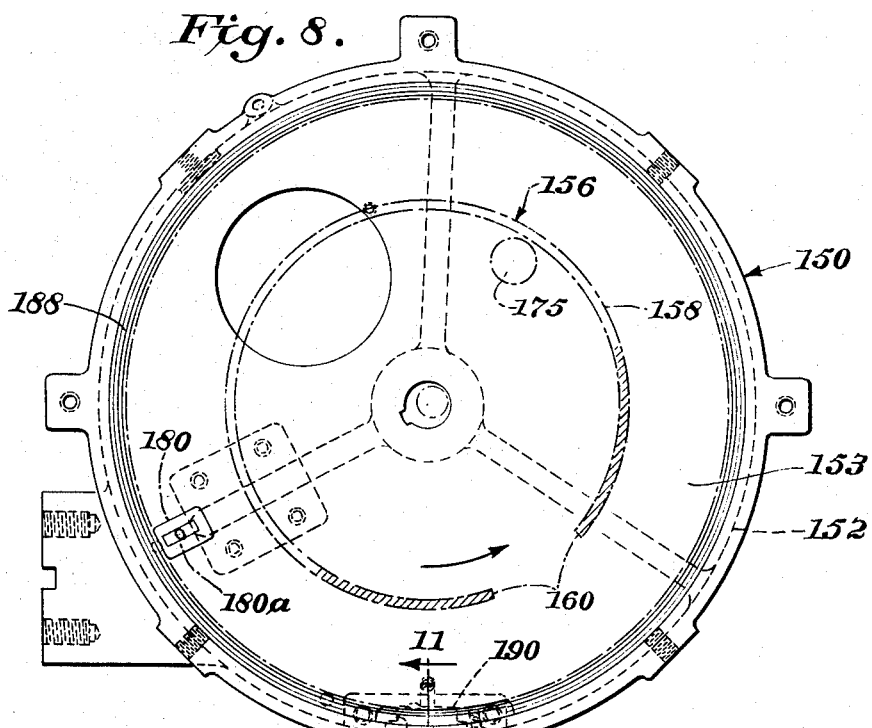
Figure 8 is a top plan view of the bowl element included in the shell feeding mechanism, the view indicating the position of various parts with respect to the bowl by means of dot and dash lines.

A second impelling means is secured to the inclined surface 171 of drum 159, this means comprising a hardened steel plate 180 of relatively small area as indicated in Figure 8. Plate 180 has an outer and central surface portion 180a which is flat. i. e., parallel to lines lying on the surface 171. The border portion of the outer surface of plate 180 is beveled downwardly to the drum surface 171 as indicated at 180b in Figure 7. The flat surface portion 180a projects about ⅛ of an inch beyond the surface 171. A third impelling means is provided at the junction of the inclined surface 171 and the vertical surface 169, this means comprising three plungers 181 positioned in bores 182 extending at 45° to the vertical (Figure 13). The thus inclined plungers 181 are spring urged outwardly to the position indicated in Figure 7. Three plungers 181 are provided, the three being equidistantly spaced about the drum as indicated in Figure 12.

A fourth impelling means comprising three horizontally arranged spring-pressed plungers 183 is provided adjacent the lower end of the skirt 169 as best indicated in Figure 7. These plungers are spring-pressed outwardly to the position illustrated in Figure 7. The plungers 183 are mounted in bores 184 equidistantly spaced about the drum. It will be noted from Figure 12 that one of the horizontally mounted plungers 183 is in vertical alignment with the impelling plate 180 and that the inclined plungers 181 are equidistantly positioned between the horizontally arranged plungers 183.

All of the above-mentioned plungers normally project about ⅛ of an inch beyond the surface of drum 159 and protuberance 175 projects about ¼ of an inch above the top surface of the drum.

As is best shown in Figure 7, a hardened steel rail 188 is secured in a circular groove formed in the lower wall 153 of bowl 150 substantially midway between the inner surface of the lining band 170 and the outer periphery of the drum. The rail 188 extends above the surface of bottom wall 153 a sufficient distance that the skirt of a shell may ride thereon without the serrated edge of the shell contacting with the bottom wall of the bowl. This arrangement prevents the serrations at the free end of a shell skirt from wearing the lower wall 153 of bowl 150.

Figure 9:
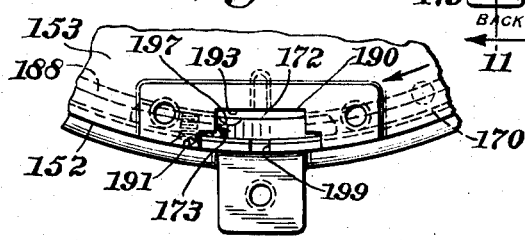
Figure 9 is a fragmentary view looking upwardly toward the shell outlet of the bowl of Figure 8.
Figure 11:
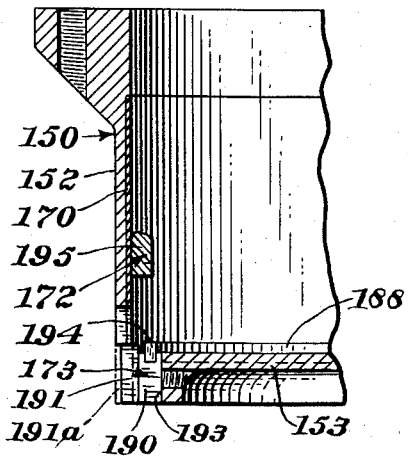
Figure 11 is a detail vertical section on the line 11—11 of Figure 8 and the line 11x—11x of Figure 10.
Figure 10:
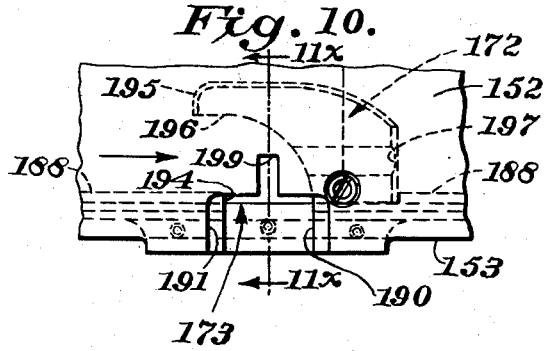
Figure 10 is a fragmentary view showing the shell outlet of the Figure 10 bowl in side elevation, i. e., looking toward Figure 11 from the left.

The outlet 173 of bowl 150 is illustrated in Figures 8 to 11. Figure 8 shows the outlet 173 as viewed from the top of the bowl while Figure 9 shows the outlet as viewed from beneath the bowl. Considering these two views with Figures 10 and 11, which respectively show the outlet in outside elevation and in transverse section, it will be observed that the outlet is formed by a notch or opening 190, rectangular in horizontal section, in the bottom wall 153 of the bowl. The opening 173 joins an enlargement 191 at its outer edge, but the enlargement will be entirely occupied by a pivoted closure plate 191a indicated in dotted lines in Figure 11 and shown in elevation in Figure 4. Hence, opening 173 is the only outlet for the shells. As is indicated in Figure 11, the inner wall 193 of outlet 173 is in vertical alignment with the surface 169 of drum 159 so that a shell moving with the drum can drop directly downwardly through outlet 173 and into the chute 53 indicated in Figure 4. The rail 188 does not extend across the outlet 173; as is indicated in Figures 9 and 10, one end 194 of the rail terminates at the edge of outlet 173, while the top surface of the other end of the rail is cut away to fit beneath deflector 172.

With the drum 159 rotating in the direction of the arrows of Figures 8 to 10 and 11a, shells will be guided downwardly toward the outlet opening 173 by the deflector 172 which is fixed to the inside wall of bowl 150 to overlie the outlet 173. As is best shown in Figure 10, deflector 172 includes an arm portion 195 which overhangs outlet 173, and the undersurface 196 of arm 195 curves downwardly toward the far side of the outlet 173. The inner surface of deflector 172 may be notched as indicated at 197, the purpose of the notch being to permit the plungers 183 to clear the deflector.

The outlet 173 has a circumferential width slightly greater than the overall diameter of the shells to be handled. Because the inner wall 193 is spaced inwardly from band 170 by a distance corresponding to the height of a shell, shells may move freely downwardly through outlet 173.

As is indicated in Figure 7, the shaft 162 to which drum 159 is fixed may have an eccentric portion 162a extending upwardly therefrom and into the tubular portion 154 of chamber 156. This slightly eccentric portion rotating within the shells falling into the chamber 156 tends to prevent the shells from accumulating in a fixed mass and also assist in moving them toward and out of the opening 160.

In the operation of the shell feeding mechanism 52, the shells will drop in substantial numbers through the funnel 155 so that a mass of shells will usually be present within the chamber 156. The rotation of the drum 159 in the direction of the arrow of Figure 8 plus the movement of the protuberance 175 with the drum will cause the shells to be impelled through the opening 160 of chamber 156. Centrifugal force induced by the rotation of the drum 159 will further urge the shells toward opening 160. Drum 159 normally rotates at a speed of the order of 122 R. P. M. The inside diameter of bowl 150 is of the order of fifteen inches, being sufficiently larger than that of chamber 156 that shells may move freely on the drum in the space between the chamber and bowl.

As the shells move out of the chamber opening 160 their movement circumferentially with drum 159 will be retarded by the spring fingers 171c positioned at the side of the opening 160 which, in terms of the direction of rotation of drum 159, is the "far" side. In more detail, because the fingers nearest the side wall 158 of chamber 156 have their ends lying close to the drum horizontal surface 168, the shells will be deflected toward the inclined surface 171 of the drum, where more space exists beneath the fingers. If a greater supply of shells is desired, the fingers closer to chamber 156 can be bent further upwardly.

Any excess of shells will accumulate in back of the spring fingers and close the opening 160, thus preventing additional shells from moving from chamber 160. In a sense, the fingers form an automatic valve which the operator can adjust to meet demands. Stated another way, spring fingers 171c comprise a resilient outlet for chamber 156.

The inclined surface 171 of drum 159 has a width in its inclined plane slightly greater than the diameter of a shell. The provision of the impeller plate 180 on this surface will keep shells moving with that surface if they do not slide directly downwardly between the band 170 and the vertical surface 169 of the drum. The inclined plungers 181 will keep the shells moving circumferentially of the bowl 150 as well as prevent shells from simply accumulating in the angle formed by the incline 171 and the band 170. When the shells drop into the space between the band 170 and the vertical surface 169 of the drum, the horizontal plungers 183 will urge the shells toward the deflector 172. The springs which urge the plungers 181 and 183 outwardly are relatively light so that if the plungers come into engagement with shells which may accumulate near or above the deflector 172, the plungers can retract to avoid damaging the shells.

The vertical wall 169 of drum 159 has a height approximately twice the overall diameter of a shell so that the shells may stand in two tiers against the surface of the drum if they happen to accumulate in that area. The undersurface 196 of deflector 172, at its inlet end, is spaced from the top surface of the bottom wall 153 of bowl 150 by a dimension of the order of one-and-one-half times the diameter of a shell and the curvilinear portion of the surface 196 is formed on a radius of approximately the same dimension. Therefore, rapidly moving shells will be smoothly deflected into the outlet 173.

Because shells must move almost 360° with drum 159 after moving beneath the fingers 171c and before they reach deflector 172, there will be ample opportunity for shells to drop upon rail 194 before they reach the deflector.

As has been mentioned above, the space 191 adjacent outlet 173 will be closed by a pivoted gate 191a as illustrated in Figure 4. Outlet 173 opens to chute 53 which includes a rectifier such as generally indicated in Figures 4 to 6.

The side wall 152 of bowl 150 is provided with a kerf 199 above the space or cut-out 191, this kerf permitting the insertion of a wire or rod to release the shells if they become jammed in the outlet 173.

*Shell delivery and adhesive supply devices*

The shell delivery wheel 54 is illustrated in Figures 17 to 27 and these same figures also illustrate the two forms of adhesive supply mechanisms 58 and 60.

The cross sectional form of the shell delivery chute 53 is illustrated in Figure 21 from which it will be observed that the chute includes a rear wall 210 and side walls 211, each side wall having a strip 212 fixed to its free edge so that the shells will be substantially enclosed by the chute. The side walls 211 have their inner surface portions of such cross section as to conform to the outline of a shell skirt.

As is best shown in Figures 17 to 22, near its lower end, the rear wall 210 of chute 53 is cut away as indicated at 213, and a spring pressed block or dog 214 pivoted on a cross pin 215 there serves as the rear wall of the chute. Block 214 is spring pressed inwardly by a spring 216 surrounding a stud 217 extending from a plate 218 fixed to the extreme lower end of the chute. Spring 216 bears between a pair of nuts 219 on stud 217 and a slotted ear 220 depending from block 214. Inward movement of block 214 is limited by engagement of the ear 220 against the fixed plate 218 of the chute. The inner surface 221 of the lower portion of block 214 is slightly inclined downwardly and away from wheel 54, the upper end of this surface being defined by a hump 221a which will be held closely adjacent the wheel by the spring 216.

The inner surface 222 of the upper portion of the block 214 is slightly concave from its top edge and downwardly to the hump 221a.

It will be observed that shells S moving downwardly in chute 53 will come into contact with block 214, this block thereby serving as a positioning means for the lowermost cap in the chute.

The extreme lower end of chute 53 is fitted with a shoe 224 pivoted upon aligned horizontal pins 225. Shoe 224 is pressed inwardly by means of a spring 226 positioned in a socket in plate 218 and a second socket in the rear face of the shoe. Outward movement of shoe 224 is limited by a stud 227 adjustable in plate 218. A stud 228 is fixed in the rear face of the shoe and extends outwardly through plate 218. Lock nuts threaded on the outer end of stud 228 are adapted to contact with the outer surface of plate 218 to adjustably limit the inward swinging movement of the shoe which results from the action of spring 226.

As is best shown in Figure 18a, shoe 224 is countergrooved to provide two shoulders 231 and a groove 224a between the shoulders. Flanges 230 extend beyond the shoulders 231. Figure 18a shows a liner L in the shell S. This is simply to illustrate a lined shell, because a shell will not contain a liner at the time it moves in shoe 224. As appears in Figure 18, the surfaces of the flanges 230 of shoe 224 which face wheel 54 are concavely curved on a radius very slightly greater than the overall radius of wheel 54 and stud 228 will hold these surfaces spaced from the periphery of the wheel. The flanges 230 are spaced apart by a distance greater than the overall diameter of a pad 55 and very slightly greater than the diameter of the skirt portion of the shell. Thus, the flanges 230 define a space within which the skirt portion of a shell may slide and with the flange F at the free end of the skirt spaced from the flanges 230. The shoulders 231 of the shoe are formed on a radius sufficiently greater than wheel 54 that the top T of a shell may slide thereon. During such movement, the outer surface of a pad 55 will engage the inner surface of the top T of the shell. Because flange F of the shell is spaced from flanges 230, the shell will be free to rock in conformity with its curvilinear movement through shoe 224.

As is hereinafter explained, shoe 224 is mounted very slightly above the shell dial 62. As also will be subsequently described, fixed stripper plates 232 and 233 (Figures 17 and 20) also positioned above dial 62, insure removal of the shells from the pads 55 and placement of the shells in the dial pockets.

Referring to Figure 22, a rod 234 is mounted in brackets 234a fixed to chute 53. If it is desired to stop the delivery of shells to wheel 54, rod 234 can be rotated to swing its angled end 235 into the chute.

As best shown in Figures 23 to 26 and as also indicated in Figure 16, the shell feeding wheel 54 is fixed to the horizontal shaft 141 which may be driven by sprocket wheel 140 and chain 139 (Figure 16) or by a gear train. Shaft 141 is journalled in a bracket 236 fixed to the upper surface of table 63. Wheel 54 includes a central hub portion 240 which is secured to the inner end of shaft 141 by means of a thumb screw 241 threaded into spacing collars such as 242 on the end of shaft 141 as shown in Figure 26. As best shown in Figure 18, hub 240 has a number of radial sockets 244 circumferentially spaced about its periphery, and studs 245 associated with the pads 55 are secured in these sockets by means of transverse pins 246.

Figure 18 shows one form of pad 55 which includes a cup-like member 248 formed integral with stud 245 and in which a resilient member 248a is held by a securing ring 249. The members 248a include a shank 248b which fits within the cup-like member 248 and an enlarged head positioned outwardly of the member 248 and the securing ring 249. The members 248a may be formed of composition rubber.

The cup-like members 248 are of such outside diameter that they will snugly fit within the skirt portion of a shell S as illustrated at the bottom of Figure 18. Hence, they serve as shell engaging portions of the pads 55 in that they nest with the shells in chute 53 to draw the shells past stop block 214 and pressure shoe 224 and convey the shells to the shell forwarding dial 62.

The resilient members 248a are of slightly less diameter than the diameter of the collars 248 and have their outer surface rounded to be partially spherical. The members 248a project sufficiently beyond the collars 248 that when a collar is engaged within the outer end of the shell skirt, member 248a will be contacting with the inner surface of the shell top wall T. The collars 248 center the members 248a in the shell so that the adhesive will be applied to the desired area of the shell top wall.

Figure 25 illustrates a slightly different form of collar 248c to support the resilient members 248a of the pads 55. The collar 248c includes a lug 252 formed on the side of the collar which will be its leading side during shell removal. A similar lug 253 is formed at the trailing side of the collar. In addition, the trailing portion of the collar is cut away as indicated at 254 so as to be beveled. As shown at the right of Figure 25 the radially outward surface of each of the lugs 252 and 253 project almost to the extreme outer surface of the corresponding resilient member 248a. By this arrangement, the leading lug 252 will contact with the lowermost portion of the skirt of the shell S resting on the stop block 214 of Figure 18 and will thereby move the shell past that stop block. As the wheel 54 continues rotation, the member 248a and the trailing lug 253 will move into the shell, the trailing lug cooperating with the leading lug to center the shell on the pad. The side flanges on the chute 53, including the flanges 230 on pressure shoe 224, will laterally center the shell. The fact that the beveled, cut-away surfaces 254 are at the trailing portion of the collar will assist in enabling the shell to be moved freely away from the wheel 54 by the shell feeding dial 62 even though the trailing lug 253 projects almost to the outermost surface of the pad 55. If desired, the trailing lug 253 may be eliminated so that the leading lug 252, alone, will center the shell by engaging the leading portion of the shell skirt.

Figures 23 to 26 illustrate one form of mechanism generally designated 58 to apply adhesive to the pads 55. This mechanism includes a fountain 258 including a drain spout 259, the fountain being provided with a laterally projecting boss 260 fixed to a horizontally extending pin 261 journalled in the bracket 236. As is best indicated in Figure 23, the opposite end of pin 261 has a depending lever 262 secured thereto. Referring to Figure 24, the lower end of lever 262 has an adjusting screw 262a threaded therein and adapted to be locked in position by a locking collar 262b. The inner end of screw 262a bears upon a rod 263 which is slidable in the bracket 236 and is connected to the armature of a solenoid 264. Solenoid 264 normally will be energized so that the rod 263, lever 262, and fountain 258 will be held in the position illustrated in Figure 24 and a fountain roll 265 in fountain 258 will be held in contact with a transfer roll 266. If operation of the machine is stopped, or, as is hereinafter explained, if feed of shells S is interrupted, solenoid 264 will be deenergized. Then the fountain 258, because of its weight, will swing downwardly or in a counterclockwise direction about the axis of pin 261, thereby moving the fountain roll 265 out of contact with the transfer roll 266. This downward swinging movement of fountain 258 is limited by a stop collar 267 fixed to the rod 263 and adapted to contact with the bracket 236.

The fountain roll 265 is of disc form and includes a socketed hub adapted to be rotatably supported between opposed pins such as 269 fitted in the fountin 258. The transfer roll 266 is rotatable upon a horizontal pin 270 projecting from a plate-like element 271. Referring to Figures 24 and 25, element 271 includes ears 272 which engage a pin 273 fixed in the upper portion of bracket 236. The position of the transfer roll 266 with respect to the fountain roll 265 may be adjusted by means of a thumb screw 275 threaded in the plate-like element 271 and adapted to have its lower end bear upon the bracket 236.

As shown in Figure 24, adhesive will be supplied to the fountain roll 265 through a supply tube 277. If the adhesive accumulates in the fountain, a suitable container may be positioned beneath drain spout 259 and the latter opened. As is also shown in Figure 24, the adhesive receiving surface of the transfer roll 266 is adapted to contact with the pads 55 of the shell feeding wheel 54. It will be observed that the rotation of the shell feeding wheel 54 will cause transfer roll 266 to be rotated and the latter will rotate the fountain roll 265 whenever the latter and its fountain are held in the upward position of Figure 24 of solenoid 264.

Figure 27 shows a second form of adhesive supply device adapted to be associated with a shell delivery wheel 54. In this form, a roll 280 is rotatable on a pin 281 fixed to a horizontally extending arm 282, arm 282 being pivoted at 283 to a bracket 236a substantially similar to the bracket 236. An upward extension 285 of bracket 236a has a horizontally extending bar 286 fixed thereto and which bar supports an adhesive supply nozzle generally designated 287. Nozzle 287 is mounted directly above the roll 280 so that adhesive dropping from the nozzle will fall upon the periphery of the roll. A spring blade 288 carried at the outer end of bar 286 bears upon the periphery of roll 280 so as to spread the adhesive which drops upon the roll. The nozzle 287 is connected to a source of adhesive by a tube 290. The delivery of adhesive by the nozzle can be controlled by adjustably seated valve generally designated 291 and including a quick shut off operating means designated 292.

The position of the roll 280 with respect to the shell feeding wheel 254 can be adjusted by means of a stop screw 293 threaded in the arm 282, the lower end of the stop screw being adapted to bear upon the bracket 236a.

Figures 27a and 27b illustrate a glue pot 294 and control which may be used with the glue supply device of Figure 27. Glue pot 294 will be secured to the machine at a point above the device of Figure 27 so that glue may move to the Figure 27 device by gravity flow through tube 290. Tube 290 is secured to a tubular valve seat fitting 295 threaded in the bottom wall of the pot. A petcock 290a may be provided in the tube adjacent fitting 295. A needle-type valve 296 is associated with seat fitting 295, the valve being fixed to a stem 296a which extends upwardly through the top or cover 297 of the pot and is adjustably secured to a rod 296b which is connected by a pin 296c to the armature 296d of a solenoid 296e. A housing 296f on the pot cover 297 encloses the solenoid and the just-described connections to its armature.

During normal operation of the machine, solenoid 296e will be de-energized and a spring 296g which surrounds stem 296a between cover 297 and rod 296b will maintain armature 296d and valve 296 upwardly so that valve 296 will be open to permit flow of glue or suitable adhesive to the shell feeding wheel 54. However, as is hereinafter explained, if the feed of shells S is interrupted, solenoid 296e will be energized to draw armature 296d and valve 296 downwardly so that the latter will close to stop feed of glue.

The top or cover 297 has a handle 297a fixed thereto and extending upwardly therefrom, and a bowed strap 297b is pivoted to the upper portion of the side wall of the pot. The cover 297 can be held in place by swinging strap 297b to a position above handle 297a and then threading thumbscrew 298 downwardly through strap 297b and into engagement with handle 297a. When cover 297 is to be removed, the operation just described is reversed and the cover, together with the valve 296 and its operating parts, can be removed from the pot. It will be observed that aside from the automatic control of glue flow by solenoid 296e, flow can also be cut-off by the petcock 290a or the valve 291 of Figure 27. Final adjustment of the feed will usually be made at the valve 291.

In operation, the adhesive supply devices 58 and 60 will apply adhesive to the resilient members 248a of the shell delivery wheel 54. Then the rotation of the wheel or drum 54 in the direction of the arrows of Figures 18 and 27 will bring a pad 55 and its corresponding shell engaging collar 248 or 248c into engagement with a shell S resting upon the spring pressed stop block 214 of chute 53. When the leading portion of the collar 248 of Figure 18 or the leading lug 252 of Figure 25 comes into contact with the lowermost portion of the shell skirt, the shell will be drawn past the stop block 214, spring 216 being light enough to permit the stop block to swing outwardly to permit this movement of the shell. It will be observed from Figure 18 that the inwardly inclined surface 222 of the stop block will so position each shell S that the lower portion of its skirt will project well into the path of the collar 248 or 248c. As a shell S moves with the shell feeding wheel 54 and past the hump 221a of the stop block, the inner surface of the shell top wall will be brought into firm contact with the resilient member 248a so that adhesive will be applied to that surface of the shell. The collar 248 or 248c causes the shell to be properly centered with respect to member 248a. The pressure shoe 224 further serves to cause the shell to firmly contact with pad 55 during the continued movement of the shell with a pad. Shoe 224 also acts as a means to guide the shell in an arcuate path with wheel or drum 54. At the moment that the shell is brought to the position indicated in dotted lines in Figure 18, a pocket of the shell feeding dial 62 will be in alignment therewith to receive the shell from wheel 54 and conduct it toward the assembly dial 72 as hereinafter described.

As is best illustrated in Figures 17 to 19, the shell feeding dial 62 comprises a central or hub element 500 including a peripheral recess at its upper edge in which a ring-like member 501 is secured by bolts 502. A second ring-like member 503, which may be formed of a plurality of arcuate sections, is secured to the underside of member 501. The element 503 has cut-outs 504 spaced about its periphery and the upper portions of these cut-outs are recessed as shown at 505 in Figures 17 and 18. The lower surface 506 (Figure 20) of each recess 505 forms a ledge along the cut-out 504 upon which the shells S will be supported. As is indicated in Figure 17, the radially inward portion of each recess 505 is formed on an arc substantially corresponding to the radius of the skirt portion of a shell S so that each recess thereby forms a shell receiving pocket.

A guide plate 507 also shown in Figure 35 is fixed to the table 63 of the machine to surround the portion of the path of movement of dial 62 through which shells are carried. As is best indicated in Figures 17 and 20, at its infeed end, guide plate 507 has the stripper plate 232 fixed thereto to extend alongside the inner radial face of the shell feeding wheel 54. The cross sectional form of plate 232 and its position with respect to wheel 54 as well as to a shell S moving with the wheel is best shown in Figure 20. It will be observed from Figure 20 that the undersurface of plate 232 will be closely adjacent the flange of a shell moving with the wheel to thereby insure that the shell will be stripped from the wheel to lie in the pocket or recess 505 of dial 62.

The other stripper plate 233 is fixed to a bar 508 projecting from the bracket 236. As is best shown in Figure 20, the upper surface of bar 508 is flush with the shell supporting surface 506 of the dial pockets 505, and plate 233 is spaced above surface 506 by a spacer 509. The lower surface of stripper plate 233 may be slightly above the upper surfaces of the flange of a shell. As best indicated in Figure 17, the inner edge 510 of spacer 509 is arcuate. As is also indicated in Figure 17, as well as in Figure 20, the shell feeding wheel 54 deposits shells in the recesses or pockets 505 at a point somewhat radially outwardly of their final position in the pockets. The inner surface 510 of spacer 509 is curved on such a radius that after a shell has been freed from wheel 54 by the stripper plates 232 and 233, the movement of the shell beneath the stripper plates and along the surface 510 will cause the shell to be urged radially inwardly of the pockets 505 to come into close contact with the radially innermost portion of the pockets.

The ends of the stripper plate 232 with which the shells first contact may be rounded or beveled to insure that the shells will readily move beneath the plates.

*Liner feeding device*

Figures 28 to 32 illustrate the liner feeding device 64 in detail. The device also appears in the upper portions of Figures 1 and 2 which indicate its position with respect to the remainder of the machine. Referring to Figure 1, it will be observed that the liner feeding device 64 is mounted at the upper end of a vertical strut 300 which projects upwardly from the base table 63. At its upper end, the strut 300 carries a horizontally projecting arm 301 shown in plan in Figure 28. Arm 301 has an open rectangular frame 302 secured thereto. A second and upper open frame member 303 rests upon the lower frame 302 as shown in Figure 30. Frame 303 has a slideway 304 fixed to each of two opposite edges thereof and the under surfaces of these slideways contact with the upper surface of lower frame 302. As is indicated in Figure 29, the other two opposite edges of the frames 302 and 303 are out of engagement so that an opening 305 is formed between each such pair of edges. The upper frame 303 includes an inclined portion 306 upon which liners L may be deposited by any suitable supply chute. An upstanding plate 307 is also secured to frame 303 opposite the inclined portion 306 to prevent the delivered liners from falling from the device.

A driven shaft 309 extending upwardly adjacent the strut 300 is journalled in the support 301 as indicated in Figure 29. Shaft 309 terminates within the lower frame 302 and has an eccentric pin 310 formed on its upper end and above support 301. The pin 310 is connected by suitable bearings 311 to an eccentric arm 312. Arm 312 has the inner race of a second bearing element 313 mounted therein at a point laterally offset with respect to the bearing 311. Bearing 313 is of the self-aligning type, and its inner race is secured to a bolt 314 which serves to clamp the inner race to a plate 315 horizontally slidable in the guideways 304 of the upper frame member 303. It will be observed that rotation of shaft 309 will cause the plate 315 to horizontally reciprocate in the slideways 304. At its central portion, plate 315 is apertured as indicated at 316 and a spout 317 is welded to the underside of the plate in alignment with this aperture. The spout 317 is of substantial diameter at its upper end and then curves inwardly so that its lower end 318 is only of such diameter that a liner L may freely move therethrough and into the top of the liner stack tube 66. The liner stack tube may include a short flexible portion so that the plate 315 will be free to reciprocate relative to the stack tube.

In order to prevent liners which fall into the upper frame member 303 from piling up in the outlet spout 317 and possibly blocking that outlet, a horizontally extending baffle plate 320 is positioned above the spout 317. In more detail, four rods 321 are secured to the shaking plate 315 by means of bolts extending through apertures 322 positioned at the corners of a rectangular area which encloses the spout opening. The baffle plate 320 is suitably secured to the upper ends of the rods 321, being vertically spaced from plate 315 by a distance slightly greater than the diameter of a liner L. In order to expedite the downward movement of the liners in the spout 317 and the liner stack tube 66, a compressed air supply tube 324 extends horizontally into the upper frame 303 from a source of compressed air, not shown. The tube 324 fits under the baffle plate 320 and then extends downwardly and centrally of the spout 317 to a point slightly below the upper end of the spout. In order that the horizontal portion of the tube 324 will not lie below the plane of baffle plate 320, the baffle plate is vertically and upwardly offset as indicated in Figure 29. Because the tube 324 is rigid, while the baffle plate reciprocates with the shaker plate 315, the offset 325 must be of sufficient transverse width to laterally clear tube 324 during reciprocation of plate 320.

The upper frame 303 is secured to the lower frame 302 by means of pivoted bolt arrangements indicated at 326. Hence, if the bolt 314 is disconnected from the plate 315, spout 317 disconnected from shaker tube 66, and the bolts 326 released; the upper frame 303 can be removed together with the shaker plate.

In the operation of the liner feeding device 64, the liners L will tumble into the device in a fairly continuous stream, falling either directly upon the shaker plate 315 or upon the baffle plate 320. As has been indicated above, baffle plate 320 will prevent any liners L from falling directly downwardly into the spout 317. For example, if baffle plate 320 is not provided, it is found that a mass of liners may fall directly into the spout and become so jammed that none fall further down into the stack tube 66. By the arrangement of the invention, any liners falling directly downwardly toward the spout 317 land upon the baffle plate and during the reciprocatory movement of that plate with the shaker plate 315, such liners as fall upon 320 will drop onto shaker plate 315 to be moved toward the spout 317 as plate 320 shakes.

The provision of the rigidly mounted compressed air jetting tube 324 extending downwardly into the laterally reciprocating spout not only breaks up any jams of liners in the spout but also insures that the relatively light liners will rapidly fall down into the stack tube 66 to lie flat upon any liners already in that tube.

It will be observed that the upper end of the spout 317 does not merge smoothly with shaker plate 315, but instead, the tube is welded to the lower surface of the plate so that a shoulder 328 is provided in the plate immediately above the spout. This shoulder, as well as the presence of the rods 321 projecting upwardly from the shaker plate 315 immediately adjacent the upper edge of spout 317, assists in moving the liners with respect to each other to thereby prevent them from forming in layers or otherwise jamming in the device.

*Liner feed control mechanism*

Referring to Figures 33 and 35, liner stack tube 66 includes a lowermost section 330 which is fixed in a plate 331 secured to a sleeve 332 which is vertically reciprocable in a vertical bore 333 of a bracket 334 secured to the upper surface of table 63. As is shown in Figures 33 and 35, the stack section 330 is provided at its extreme lower end with inwardly and horizontally projecting flanges 336 and, as best appears in Figure 33, these flanges define a space between them. The liner feeding dial 68 is provided with a plurality of liner receiving pockets, and a tooth 338 projects upwardly from the trailing side of each pocket. The provision of the flanges 336 on the stack tube section 330 and the teeth 338 on the liner removing dial is similar to the arrangement described in the application of Eibe A. Wilckens, Serial No. 69,516, filed January 6, 1949, for Closure Cap Assembling Apparatus.

As is described in said Wilckens application and as is illustrated in Figure 33, the circumferential wall of stack section 330 is slotted as indicated at 340 on the side at which the teeth 338 will enter the stack section. Slot 340 is only of sufficient height to expose the lowermost liner in the stack to the tooth 338, and the tooth 338 extends only a sufficient height above the liner dial 68 to contact with the lowermost liner in the stack. The opposite side of the stack is cut away above the flanges 336 as indicated at 341 so that the lowermost liner may move freely off the flanges to drop into a dial pocket immediately in advance of its tooth 338.

The liner feeding dial 68 rotates in the direction of the arrow 68' of Figures 3 and 35 to thereby carry the liners toward the assembly dial 72. As is described in said Wilckens application, the pockets of the liner feeding dial 68 rotate above a fixed plate 345 and the pockets simply slide the liners along the plate 345. When a pocket of the liner feeding dial 68 moves its liner above the corresponding aperture 78 of the assembly dial 72, the liner will be free to drop into the aperture 78.

As appears in Figures 35 and 37, the plate 345 may lie above a portion of the shell feeding dial 62.

As is described in said Wilckens application, the shells S will be positioned on the lower flange 74 of the assembly dial 72 and in alignment with the apparatus 78 and the upper flange 76. Immediately beyond the point at which the liners L are positioned in the apparatus 78, the corresponding plunger 80 of the assembly dial will descend, as hereinafter described, to press the liner L downwardly into the shell S.

In order to prevent the feeding of a liner L to a pocket of the liner feeding dial 68 in the event that the corresponding pocket of the shell feeding dial receives no shell from the shell feeding wheel 54, the mechanism described below is provided:

A pin 350 extends through the sleeve 332 of the liner stack supporting bracket 331 and the hardened lower end of pin 350 rests upon the horizontally disposed arm 351 of a bell crank 352 pivoted at 354 to the liner stack tube supporting bracket 334. The vertical arm of bell crank 352 is pivotally connected to one end of a link 353 which, as shown in Figures 35 and 37, extends horizontally above the upper surface of table 63 and below the shell feeding dial 62. A collar 356 is adjustably mounted on link 353 and an expansible spring 357 is positioned between this collar and the bracket 334 to thereby urge the link 353 to the left as viewed in Figure 37.

Figure 34:
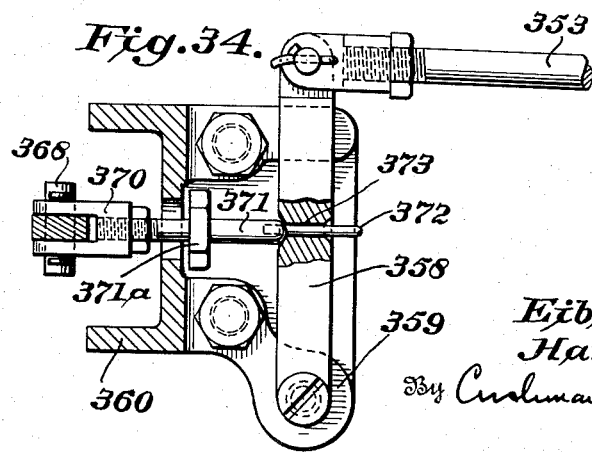
Figure 34 is a fragmentary horizontal section on the line 34—34 of Figure 37.
Figure 43:
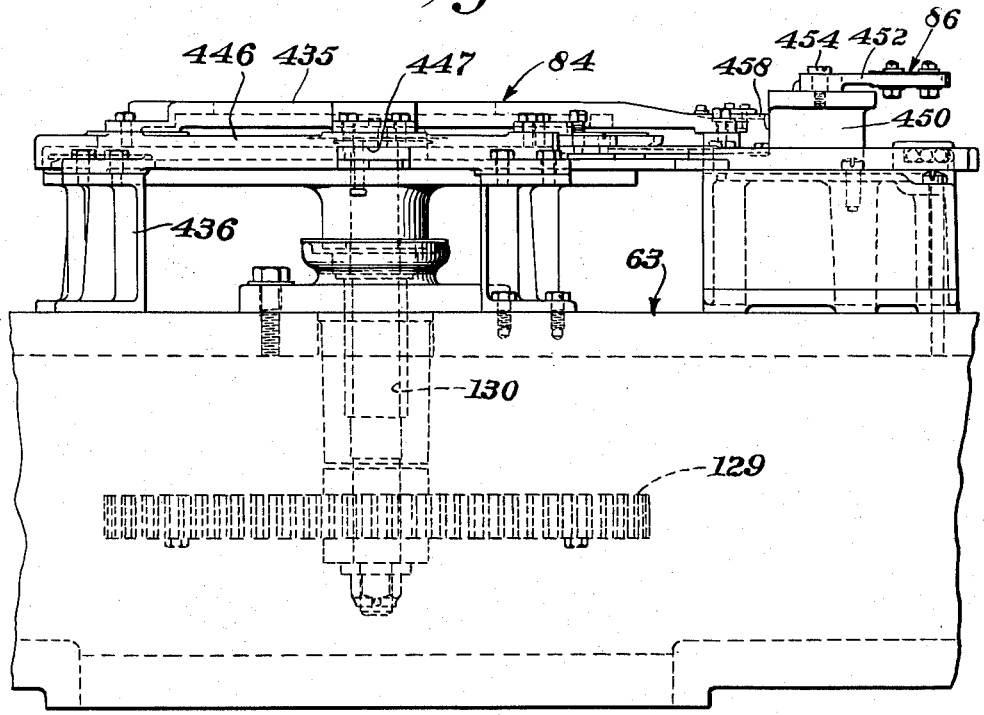
Figure 43 is an elevation of the Figure 39 structure, the view looking toward Figure 39 from the lower edge of the latter figure.
Figure 44:
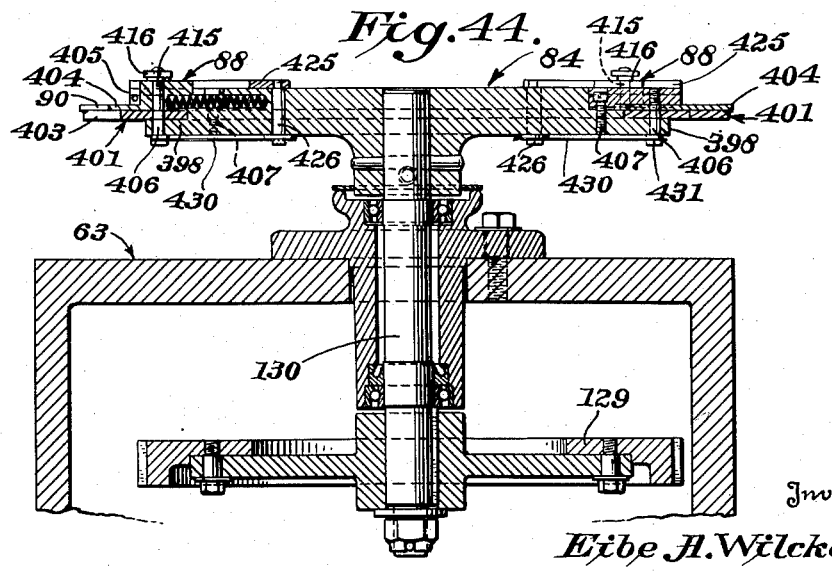
Figure 44 is a diametrical section of the dial of Figures 39 and 42, both ejectors illustrated being shown in latched position.

At its left-hand end, as illustrated in Figures 34 and 35, link 353 is pivotally connected to one end of a horizontally disposed lever 358, the opposite end of the lever being pivoted to a fitting 359 secured (Figure 37) to a bracket 360 fixed to the machine table 63.

As is also illustrated in Figure 37, a slide 361 is mounted for horizontal movement in the upper portion of the bracket 360, slide 361 being movable along a line radial to the axis of shell feeding dial 62. The shell feeding dial 62 shown in Figures 35 to 37 is of slightly different form from that shown in Figures 17, 18 and 20 in that it includes a lower ring member 363 upon which the shells S will be supported. Ring member 363 is secured to hub member 500' and has strips 364 spaced thereabout as shown in Figure 35, the strips being of such form that an adjacent pair will securely hold a shell against radially inward and circumferential movement with respect to the dial. The dial of Figures 17, 18 and 20 can be used with the liner feed control mechanism in exactly the same manner as the dial of Figures 35 to 37.

The shells are held in the pockets formed by the strips 364 by a guide plate 507 which surrounds the portion of the path of movement of dial 62 through which shells are carried. The inner end of the slide 361 is notched as at 366 to closely laterally fit the skirt of a shell. Slide 361 is pivotally connected by a pin 367 to a vertically extending lever 368 pivoted intermediate its length at 369 to the bracket 360. The lower end of lever 368 is pivoted to a yoke 370 which, as shown in Figure 34, extends horizontally toward the lever 358. Yoke 370 is adjustably secured to a pin 371 having its inner end 372 reduced to extend through an aperture 373 of corresponding size positioned midway of the length of lever 358.

The operation of the liner feed control mechanism described above is as follows: So long as every pocket of the shell feeding dial 62 receives a shell S from the shell feeding wheel 54, the resulting presence of shells in the dial pockets will hold the slide 361 in the position illustrated in Figure 37. Therefore, lever 368, pin 371, lever 358 and link 353 will be in the position illustrated in Figure 37 so that bellcrank 352 will occupy the position shown in that figure. As a result, the horizontal arm 351 of bellcrank 352 will be in the downward position illustrated in Figure 37 and stack tube section 330 or liner supply means will be lowered so that as each tooth 338 of the liner feeding or supporting dial 68 moves beneath stack section 330, the lowermost liner in the stack will be removed to drop into the corresponding pocket of the liner feeding dial 68. This position of the parts will be resisted by the spring 357 which is urging the link 353 to the left as viewed in the drawings.

In the event that a pocket of the shell feeding dial 62 does not have a shell S placed therein by the shell delivery wheel 54, when that pocket moves opposite the slide 361, the latter will be urged to the right from the position illustrated in Figure 37 by the action of the spring 357. The resultant movement of link 353 to the left will cause the bellcrank 352 to be rotated in a clockwise direction as viewed in Figure 37. The pin 350 secured to the sleeve 332 will thereby be forced upwardly to lift the lower stack section 330 as shown in Figure 33. Hence, when the next tooth 338 of the liner feeding dial 68 moves beneath stack 330, the lowermost liner in the stack will be raised as shown in Figure 33 and that tooth will not contact with the lowermost liner in the stack. As soon as a pocket of a shell feeding dial 62 containing a shell moves opposite slide 361, the parts will return to the position illustrated in Figure 37.

A nut 371a on pin 371 limits movement of link 353 to the left in Figure 37 and thereby limits inward movement of slide 361.

It will be understood that the pockets of the shell feeding dial 62 and the liner feeding dial 68 will be so arranged with respect to each other, and the liner stack 66 and slide 361 are so positioned with respect to their respective dials, that when a pocket of the shell feeding dial 62 fails to receive a shell, the stack section 330 will be lifted out of the path of the tooth 338 of the corresponding pocket of the liner feeding dial.

Bellcrank 352 has an arm 375 fixed thereto which normally holds a switch generally designated 376 in circuit closing position. Switch 376 controls electromagnet 264 associated with the adhesive supply device of Figure 24. When the liner stack 66 is in lowered position, switch 376 will be closed to energize magnet 264 so that supply of adhesive by fountain roll 265 to wheel 266 will occur. However, if the liner stack is lifted, switch 376 will open to de-energize magnet 264 so that fountain roll 265 will drop away from wheel 266 so that the supply of adhesive to the latter will be interrupted until stack 66 is again permitted to drop, viz., a shell is present in a pocket of dial 62.

If the adhesive supply device of Figure 27 is provided on the machine, together with the control of Figures 27a and 27b, switch 376 will be normally open. That is, when stack 66 is in lowered position to feed liners the switch will be open, while when the liner stack lifts, the switch will close to energize magnet 296e so that valve 296 will close.

While provision of switch 376 and magnet 264 or 296e will interrupt the adhesive supply if even one shell is missing, the principal purpose of the arrangement is to insure that the supply will be reduced if a number of shells is missing and so that adhesive will not unduly accumulate on the pads of shell feeding drum 54.

*Assembly dial*

The assembly dial of the present machine is generally similar to that disclosed in said Wilckens application Serial No. 69,516. As is illustrated in Figure 33, the assembly dial generally comprises a turret 390 fixed to the assembly dial shaft 120, the plungers 80 being vertically reciprocable in the turret and in alignment with the apertures 78 in the liner receiving flange 76 positioned below the turret. Each plunger 80 is urged to downward position by a spring 350 having its upper end bearing upon a flange 391 projecting from the turret, the lower end of the spring bearing against a flange 392 formed on the plunger. The plungers are reciprocated by the engagement of plunger carried rollers 393 with a circular cam track 394 which extends circumferentially of a cam block 395 arranged concentrically with shaft 120 but fixed against rotation by members, not shown, extending upwardly from the table 63.

The design of the cam track 394 is such that immediately beyond the point at which a liner is placed on the upper flange 76 of the assembly dial, each plunger 80 will be free to move downwardly under the action of its spring 350. This downward movement of the plunger will press the liner L downwardly through the aperture 78 and into the shell S positioned on the lower flange 74. The aperture is tapered to be of reduced diameter at its lower end to thereby guide the liner into the shell. After the liner has moved into the shell, it will expand radially to have a snug fit in the shell. The plunger 80 will remain in downward position until it moves adjacent the stripper plate 82 of Figure 39 when it will be lifted by the cam track 394 to the raised position shown at the left of Figure 33.

It will be observed that if a pocket of the liner feeding dial 68 fails to receive a liner, the plunger 80 of the corresponding pocket of the assembly dial 72 will be free to move downwardly to a further extent. As a result, the flange 392 of that plunger may also move downwardly to a greater than normal extent. In such case, the flange 392 will contact with a detector 86 with the results described below.

*Shell ejector mechanism*

As has been explained in connection with Figures 35 to 37, the invention includes means to prevent the feeding of a liner in the event that a corresponding pocket of the shell feeding dial 62 fails to receive a shell from shell delivery wheel 54. Figures 39 to 44 illustrate the arrangement of the present invention whereby if a pocket of the liner feeding dial does not receive a liner from the liner stack 66, the shell S placed in the corresponding pocket of the shell feeding dial will be ejected from the machine. The ejection occurs at the transfer dial 84 and comprises the mechanism described below.

The transfer dial 84 is of disk-like form and, as shown in Figure 40, includes a horizontal flange 398 projecting from the lower portion of its periphery. Inwardly of flange 398 the upper surface of disk 84 is stepped to provide a horizontal surface 399 terminating at its inner end at a vertical shoulder 400. Flange 398 supports a flat annulus 401 which may be formed of two or more arcuate pieces. As shown in Figure 42, the annulus 401 is provided with a circumferential series of notches 402 to form intervening teeth 403.

A series of strips 404 is secured upon the upper surface of the annulus 401, a strip 404 extending outwardly upon each tooth 403 and being so located and of such shape that adjacent strips serve to center and support a shell S between them and upon the teeth 403 above the notches 402.

A series of plates 405 is secured to the dial 84, one upon each of the strips 404. The plates 405 lie inwardly of the inner ends of the notches 402 and extend backwardly to abut the shoulder 400 of disk 84. As is shown in Figure 40, pins 406 extending through flange 398 hold the annululs 401 and the plates 405 rigidly upon the disk 84. As also shown in Figure 41, a machine screw 407 extends downwardly from the inner portion of each plate 405 and into the surface 399.

As appears from Figure 42, the plates 405 are of wedge-shape form in plan so that the opposed edges 408 of adjacent plates 405 are parallel to each other and to a radius of dial 84. In addition, as shown in Figure 41, the faces 408 are provided with overhanging flanges 409. In this way, a slideway 401 is provided between adjacent plates 405, the inner end of the slideway terminating at shoulder 400 and the lower surface of each slideway being formed by the surface 399 and the upper surface of annulus 401.

An ejector block 412 is positioned in each slideway 410. Figure 40 shows the form of an ejector in radial section and it will be observed that each ejector includes an outwardly projecting tongue 413 which lies between adjacent plates 405. The ejector block extends somewhat above the upper surface 414 of dial 84, and this upwardly projecting portion carries a vertically extending pin 415 fitted with a cam following roller 416. The inward surface of each block 412 is provided with a pocket in which one end of a spring 417 is fitted, the other end of the spring extending into a pocket 418 in the vertical shoulder 400 of disk 84. Spring 417 urges the block 412 radially outward in its slideway 410 of disk 84. Figure 41 shows the form of a block 412 as viewed in transverse section, from which it will be observed that the blocks are shaped to coincide with the shape of the trackways 410 and so that the overhanging shoulders 409 will hold the blocks against vertical movement.

A detent 420 (Figure 40) may be provided at the outer end of each trackway 410 to limit outward movement of the ejector blocks 412.

A laterally movable swinging latch 425 is associated with each ejector block 412, each latch being fixed to a corresponding vertical pin 426 pivotally supported in the disk 84. From pin 426, each latch extends radially outwardly to lie alongside of the upwardly projecting portion of an ejector block 412. Each latch also includes a tooth 427 adapted to engage the outer face 428 of the upward extension of its ejector block 412. As is shown in Figure 40 and in the upper left-hand portion of Figure 42, a horizontally arranged spring wire 430 extends through an aperture in the lower end of the latch pivot pin 426, the opposite end of the wire being bent to fit in a groove 431 in the fixed pin 406. Wire 430 serves as a spring which urges the corresponding latch pivot pin 426, and thereby its latch 425, toward its ejector block 412, viz., in a clockwise direction as viewed in Figure 42.

A cam element generally designated 435 is secured to the fixed frame 436 which surrounds the assembly dial 84, this cam lying immediately above the dial so that its cam surfaces will be in the same horizontal plane as the cam engaging rollers 416 of the various ejector blocks 412. Cam 435 includes an entry end 440 best indicated in Figure 42 and which tapers inwardly to a latch release point and rise 441. Clockwise from release point or rise 441, the cam includes a relatively long and slight dwell 442 which terminates in a sharp ejector dwell 443. Then the cam tapers inwardly to form a resetting rise 444 with an outfeed dwell 445 extending from rise 444 to the outfeed end of the cam. The manner in which the cam 435 controls the ejector blocks 412 is hereinafter explained.

As is indicated in Figure 42, a guide plate 446 surrounds the path of movement of the transfer dial 84 to thereby prevent caps from moving radially outwardly from the pockets formed by the strips 404. However, this guide plate includes an opening 447 immediately adjacent the ejector dwell 443 of cam 435.

Referring to the right-hand portion of Figure 42, a bracket 450 is fixed to the table 63 adjacent the stripper plate 82 which guides the caps from the assembly dial 72 to the transfer dial 84. Bracket 450 serves as a mounting for the detector 86. As is indicated in Figure 33, the detector 86 includes a blade 451 positioned in a plane immediately above the lower guide flange 452 for the plungers 80 of the assembly mechanism 76.

As is indicated in Figure 42, the blade 451 is of such length that it will not span two adjacent plungers 80 of the assembly dial. Blade 451 is fixed to one arm 452 of a bellcrank 453 pivoted at 454 on bracket 450. A spring pressed plunger 455 urges the blade 451 inwardly against the plungers 80 of the assembly dial. The other arm 456 of the bell crank bears against a roller 457 extending upwardly from a slide 458 mounted in fittings 459 so as to be rectilinearly movable along a line radial to transfer dial 84. A spring 458a urges slide 458 to the right in Figures 39 and 42.

The end of slide 458 adjacent dial 84 carries a tooth 460 which lies in the horizontal plane of the latches 425. The tooth or trip 460 is pivoted upon a vertical pin 462 on slide 458. A spring blade 463 normally holds trip 460 in the position illustrated in Figure 42. Spring 463 is sufficiently strong that it will hold trip 460 from moving counterclockwise on its pivot 462 if the outer end 461 or a normally engaged latch 425 strikes the trip. However, if a latch is jammed, spring 463 will permit the trip to swing counterclockwise to thereby avoid breaking the latch or tooth.

A cap guide plate 465 is mounted adjacent assembly dial 72 on the bracket 450 below and free of the detector blade 451, guide plate 465 lying in a horizontal plane immediately below the upper flange 76 of the assembly dial 72. The plate thereby holds the caps in proper position in the assembly dial. Plate 465 is adapted to be swung to adjusted position about a pivot 466 and can then be locked in such position by means of a set screw 467 extending into the bracket 450.

A plunger 468 extends rearwardly from the detector plate 451 to actuate a signal light switch 469 whenever the detector blade is moved outwardly. The circuit of the signal light preferably is so arranged that it will remain closed until the operator opens it. By this arrangement, the attention of the operator will be directed to any continuing fault in operation of the machine.

The operation of the liner detector is as follows:

The assembly dial 72 rotates in the direction of the arrow 72' and the transfer dial rotates in the direction of the arrow 84' of Figures 39 and 42. When a plunger 80 of assembly dial 72 moves past the detector blade 451, and if such plunger has a liner and a shell beneath it, the flange 392 of the plunger will not be in extreme lowered position and, therefore, the plunger flange 392 will ride above and out of contact with the detector blade 451. Hence, the position of the blade 451, bellcrank 453, slide 458 and trip 460 will not be changed from the position shown in Figures 39 and 42. When the plunger 80 is raised out of contact with the cap C beneath it by cam track 394 of the assembly dial, stripper 82 will direct the cap into a pocket 90 of transfer dial 84.

At the same instant that the plunger 80 and cap C described in the preceding paragraph moved past detector blade 451, the ejector latch 425 associated with the transfer dial pocket 90 intended to receive that cap moved past the trip 460. Because trip 460 was not moved from the illustrated position by movement of the plunger 80 past detector blade 451, trip 460 did not contact with that latch 425. As is hereinafter explained, the result is that when the latch 425 under discussion reaches the point indicated at P1 in Figure 39, the latch is in engagement with the surface 428 of ejector block 412 to hold the block in the inward position indicated in Figure 40.

When the assembled cap C is placed in the transfer dial pocket 90, it moves with the dial while the ejector block roller 416 remains in the dotted line position indicated, for example, at position P1 in Figures 39 and 42.

For reasons subsequently explained, when the ejector block reaches resetting rise 444, engagement of its roller 416 with that rise will move the block inwardly so that its latching face 428 will be free of latch 425. However, when roller 416 comes opposite dwell 445, the block will move outwardly again to bring face 428 into contact with the latch detent. Then cap C will continue to move with the transfer dial with the corresponding ejector block and roller 416 in latched position until the cap is stripped from the transfer dial by the stripper plate 475. Just prior to this removal of the cap, the waxing device 91 will apply wax to the liner in accordance with usual practice. Stripper 475 will direct the cap to the presser dial 92.

After stripper 475 has removed the cap from the pocket 90 under discussion, the continued rotation of the transfer dial 84 will bring the ejector block roller 416 of that pocket to the infeed end 440 of cam 435. Referring now to Figure 42, the latch release rise 441 beginning at point 440 will cause the roller 416 and its ejector block to move inwardly with respect to the block slideway 410 and to the position indicated at P2 in Figure 42. It will be observed that at this point, the slide block 412 has been moved inwardly sufficiently far by the action of the rise 441 on roller 416 that the latching surface 428 of the block is spaced inwardly from the detent surface 427 of the latch. Hence, the latch is not held under any tension by the pressure of the slide block pressure spring 417. However, the action of the latch spring 430 holds the latch against the lateral surface of the slide block.

If the trip 460 is not moved inwardly at this instant, the slightly further clockwise rotation of transfer dial 84 will bring the roller 416 past the rise 441 and to the dwell 442. With latch 425 still bearing against the lateral face of the latch, the outward movement of roller 416 and slideblock 412 permitted by dwell 442 will simply bring the latching face 428 of the slide block into contact with the detent 427 of the latch so that the roller will not ride outwardly sufficiently far to contact with the dwell 442. This position of the roller is indicated, for example, at position P1 in Figure 42. As has been explained above, the cap intended for the pocket 90 controlled by the latch under discussion will move into that pocket and will subsequently be delivered to presser dial 92.

Assume now that one of the plungers 80 of the assembly dial does not have a liner L placed beneath it by liner feeding dial 68. In such case, when the assembly dial cam track 394 permits that plunger to be lowered by the action of the spring 350, the plunger flange 392 will descend to the plane of detector blade 451. Because flange 392 is of greater diameter than the plunger 80, the detector blade 451 will be moved outwardly from the position illustrated in solid lines in Figures 39 and 42 and to the dotted line position indicated at 451a. Movement of blade 451 to this latter position will cause bell crank 453 to swing counterclockwise to thereby move the slide 458 and trip 460 to the left from the position shown in Figures 39 and 42. As a result, the next latch 425 which comes opposite trip 460 from position P2 will strike the trip. Therefore, the latch will be swung counterclockwise on its pivot 426 and against the action of its spring 430. (It will be recalled that at P2, a latch is out of contact with its ejector block 412 so that no great force need be applied to the latch by trip 460 to swing the latch counterclockwise.) Immediately thereafter, and while the latch is still held counterclockwise by trip 460, the roller 416 associated with that latch will move off the latch release rise 441 and into the dwell 442, viz., to the position indicated at P4 in Figure 42. It will be observed that in this position the latching surface 428 of slide block 412 will be outwardly of the detent surface 427 of the latch. In other words, the position of the slide block is no longer controlled by the latch, but, instead, by the cam 435.

When the transfer dial pocket 90 under discussion now reaches position P1 in Figure 42, it will receive the shell S which does not contain a liner L, and as was indicated by the just-mentioned operation of the detector blade 451 and trip 460. When the ejector block 412 under discussion reaches the end of the dwell 442, the fact that the roller 416 is under control of the cam 435 will result in the roller moving into the ejector dwell 443 as indicated at position P5 in Figure 42. Because the roller 416 thereby moves sharply radially outward to correspondingly move its ejector block 412 outwardly, the shell in that pocket will be ejected through the ejector opening 447.

The continued rotation of the transfer dial will cause the roller 416 under discussion to now move along the rise indicated at 444. This rise extends sufficiently far inwardly, viz., radially of the dial, that the roller 416 and ejector block 412 will move inwardly far enough to permit the latch detent 427 to re-engage the surface 428 of the ejector block. Although the cam 435 includes a further dwell 445, the roller 416 will not be free to follow that dwell but will remain inwardly thereof as indicated at position P6 in Figure 42. This position of the ejector block and latch is also indicated in the fragmental section in the upper left-hand portion of Figure 42.

It will be understood that detector 451 and trip 460 will return to normal position immediately a shell containing a liner moves adjacent the detector.

The ejector block under discussion will remain latched until its roller 416 again contacts with the latch release rise 441 as has been described above. The resultant action at that point will depend upon whether a shell containing a liner is then opposite the detector blade 451.

In the event that, by some chance, a latch does not re-engage at the dwell 444, position P6, the corresponding ejector block will remain outwardly until the roller of that latch reaches the infeed end 440 of cam 435. An ejector block in this position is indicated at position P7. The provision of the marked infeed dwell 441 insures that a roller in the outward position indicated at P7 will be moved inwardly by the infeed end of the cam.

As has been mentioned above, the properly assembled caps will be moved by a stripper plate 475 to the presser dial 92 which is heated by the gas burner 94. After movement through that dial, the assembled caps, with their liners firmly secured to the shells, will move upon the outfeed conveyor 50.

Figures 45 and 46 show a modified form of spring to urge the latches 425 into engagement with the ejector blocks 412. Referring to these figures, each latch 425 is provided with a flat spring strip 430a instead of with the spring wire 430 of Figures 39 to 44. The spring strips 430a have their inner ends mounted in radial slots 475 formed in a disk 476 which is centrally apertured as at 477, the aperture fitting a stud 478 on shaft 130 so that the disk 476 may be mounted co-axially with the shaft 130 to which ejector table 84 is fixed. Disk 476 is provided with an upwardly facing circular recess 479 in its upper face and each spring strip 430a has its upper edge notched (Figure 47) as at 480 at a point coinciding with recess 479.

A second disk or cover 481 is mounted above disk 476, disk 481 being provided with a circular shoulder to fit the recess 479 and notches 480 so that the spring strips are thereby held against movement radially of the table.

The two disks 476 and 481 are secured together by bolts 482 which extend through disk 481 to thread into disk 476. A second pair of bolts 483 extend through aligned arcuate slots 484 in both disks and thread into bores in the table 84. If it is necessary to adjust the pressure which the strips 430a exert on the latches 425, this can simultaneously be accomplished for all of the strips by loosening the bolts 483 and rotating both disks in the proper direction about shaft 130. Then the bolts 483 can be tightened to maintain the adjustment. The latches may be flattened at their pivoted ends as indicated at 485, so that the spring strip for one latch will not interfere with movement of the following latch.

As is indicated in Figure 48, the slidable element of clutch 142 carries a switch blade 490 which is adapted to engage a second switch blade 491 when the clutch is in engaged position to thereby drive the cap element feeding means. When the two blades are in contact, a circuit will be closed through a solenoid 492 to thereby open a valve 493 in a line 494 which supplies gas to the burner 94 which heats the presser dial 92. Whenever clutch 142 is disengaged to thereby stop the movement of all the elements which feed cap parts to presser dial 92, switch blade 490 will move to the right and out of contact with blade 491, thereby opening the circuit through solenoid 492 and permitting a spring 495 to move valve 493 to at least substantially closed position. This will at least markedly lower the flame at burner 94. The arrangement prevents the cap handling elements of dial 92 from becoming too hot when caps are not being delivered to that dial.

Alternatively, the gas valve 493 may be opened by energization of a solenoid which is energized whenever the motor 101 is operating.

Subject matter disclosed but not claimed herein may be claimed in our divisional application Serial No. 259,877, filed December 4, 1951, for Shell Feeding Mechanism.

The terminology used in the specification is for the

We claim:

1. In a feeding device for skirted cap shells, a base table, a vertically arranged chute extending downwardly toward said base, a drum rotatable on said base table about a horizontal axis, a plurality of shell engaging pads circumferentially spaced about said drum to move in a vertical plane, each pad including a collar of such diameter that it will fit within and engage the skirt of a shell, said collars lying in a path of rotary movement with said drum which closely approaches said chute and said table, a stop block pivoted in said chute, resilient means to urge said block toward said drum along a horizontal line substantially coinciding with the drum axis, and an arcuate member extending from the lower portion of said stop block to said table.

2. A shell feeding device of the character described in claim 1 wherein said arcuate member is pivoted upon said chute and resilient means is provided to hold said member closely adjacent the path of movement of said pads.

3. A shell feeding device of the character described in claim 1 wherein said arcuate member includes flanges lying closely adjacent the peripheral face of said drum.

4. A shell feeding device of the character described in claim 1 including means to apply adhesive to said pads.

5. A shell feeding device of the character described in claim 1 wherein each of said pads includes a resilient member within and projecting radially beyond said shell engaging collar, and means to apply adhesive to said resilient member.

6. A shell feeding device of the character described in claim 1 wherein each of said shell engaging collars includes a radial projection at each of its portions which are leading and trailing portions with respect to the path of rotation of said drum.

7. In combination, a base table, a cap shell chute terminating above said table, a rotary drum journalled about a horizontal axis and on said table and including pads spaced about its periphery and arranged to engage shells in said chute, and means to apply adhesive to said pads including a rotary wheel in peripheral contact with the pads of said drum, an adhesive supply tube having an outlet above the periphery of said wheel, and spreader means contacting with the periphery of said wheel.

8. In combination, a base table, a cap shell chute terminating above said table, a rotary drum journalled about a horizontal axis and on said table and including pads spaced about its periphery and arranged to engage shells in said chute, and means to apply adhesive to said pads including a rotary wheel in peripheral contact with the pads of said drum, a fountain including a fountain roll arranged to peripherally contact with said wheel, said fountain being pivotally mounted on said base, means to normally hold said fountain in position to maintain said fountain roll in contact with said wheel, and means to move said fountain from said position.

9. In an apparatus for assembling cap liners and shells, shell feeding means, means to supply shells to said shell feeding means, means to apply adhesive to shells moving with said shell feeding means, and means to render said adhesive applying means inoperative upon failure of said shell supply means to deliver a shell to said shell feeding means.

10. In an apparatus for assembling skirted shells and liners to form caps, a base, a shell feeding element movable upon said base and including a series of pockets open at one side thereof, means to position shells in the pockets of said element, a liner feeding stack vertically movable on said base, a liner feeding element movable upon said base beneath said stack and including a series of pockets, an upwardly projecting tooth adjacent each pocket of said liner feeding element and arranged to remove the lowermost liner of said stack, detector means movable on said base and positioned opposite the path of movement of the open side of the pockets of said shell feeding element, means operatively connecting said detector means to said liner feeding stack, and means effective upon the absence of a shell from a pocket of said shell feeding element to urge said detector into such pocket and raise said stack out of the path of movement of a tooth of the liner feeding element.

11. In an apparatus for assembling two part articles, a first movable carrier for the articles, a detector in the path of movement of said carrier and responsive to the lack of one of the parts of the article, a second movable carrier in receiving relation to said first carrier and including an article receiving pocket, an ejector in the pocket of said second carrier, said ejector being movable outwardly of the pocket to eject an article part from the pocket, a latch to normally engage and hold said ejector inwardly of the pocket, trip means operable by said detector to release said latch from holding engagement with the ejector when one part of an article is not present on said first carrier, means to move said ejector outwardly of said second carrier pocket to eject the other part of the article from said pocket, and means to reset said latch.

12. In an apparatus for assembling cap parts into caps, a first rotatable dial to support a part of a cap, a second rotatable dial, each of said dials including cap part supporting pockets about its periphery, said first dial being arranged to supply cap parts to said second dial, a detector in the path of movement of said first dial and responsive to the lack of a cap part in a pocket of said dial, a series of ejectors, one in each pocket of said second dial, and means operable by said detector to move said ejectors to ejecting position.

13. In an apparatus for assembling cap parts into caps, a first rotatable dial to support a part of a cap, a second rotatable dial, each of said dials including cap part supporting pockets about its periphery, said first dial arranged to supply cap parts to said second dial, a detector in the path of movement of said first dial and responsive to the lack of a cap part in a pocket of said dial, a series of ejectors, one in each pocket of said dial, a series of ejectors, one in each pocket of said second dial, means to urge said ejectors to ejecting position, means to normally hold said ejectors in non-ejecting position, and trip means operable by said detector to actuate said ejector holding means to non-holding position.

14. In an apparatus for assembling cap shells and liners to form caps, a first rotatable dial to support a cap, a second rotatable dial, each of said dials including pockets about its periphery, said first dial being arranged to supply caps to said second dial, a detector in the path of movement of said first dial and responsive to the lack of a liner in a pocket of said dial, a series of ejectors, one in each pocket of said second dial, means to urge said ejectors to ejecting position, means to normally hold said ejectors in non-ejecting position, and trip means operable by said detector to actuate said ejector holding means to non-holding position.

15. Apparatus of the character described in claim 14, wherein the first dial includes plungers vertically movable in its pockets, said plungers being provided with detector actuating portions movable into the plane of said detector when no liner is in the corresponding pocket.

16. Apparatus of the character described in claim 14, wherein said ejectors are radially slidable of the pockets of said second dial.

17. Apparatus of the character described in claim 14, wherein said ejectors are radially slidable of the pockets of said second dial, and each of said ejector holding means includes a latch pivoted on said second dial.

18. Apparatus of the character described in claim 17, wherein each of said latches has a spring associated therewith to urge it to ejector holding position, and means is provided to simultaneously adjust the tension of all of the springs.

19. Apparatus of the character described in claim 18 wherein the springs are flat strips extending radially of a disk concentric with and adjustable circumferentially of said second dial.

20. In an apparatus for assembling cap shells and liners to form caps, a first rotatable dial to support a cap, a second rotatable dial, each of said dials including pockets about its periphery, said first dial being arranged to supply caps to said second dial, a detector in the path of movement of said first dial and responsive to the lack of a liner in a pocket of said dial, a series of ejectors, one in each pocket of said second dial, means to urge said ejectors to ejecting position, latches on said second dial associated with said respective ejectors, means to urge said latches into engagement with their ejectors, a fixed cam adjacent said second dial, said cam including an ejector engaging portion at one point in the path of movement of said ejectors with said second dial, said cam portion being arranged to move an ejector out of engagement with its latch, and means operable by said detector and positioned at said point to move a latch out of the path of its ejector so that the ejector will thereafter be free to move to ejecting position.

21. An apparatus of the character described in claim 20 wherein said cam includes a second portion immediately beyond said first-mentioned portion and which is arranged to temporarily hold the ejectors in non-ejecting position, and said first dial supplies caps to said second dial during the movement of the ejectors in said second portion.

22. An apparatus of the character described in claim 20 wherein said cam includes a second portion to reset said ejectors in engagement with said latches.

23. In combination, a base table, a cap shell chute arranged above said table, a horizontally disposed shell receiving dial rotatable about a vertical axis and including upwardly facing shell receiving pockets spaced about its periphery, a rotatable drum journalled about a horizontal axis and including pads spaced about its periphery to engage shells in said chute and move them downwardly toward the pockets of said dial, and a horizontal blade fixed with respect to said base table and projecting alongside the path of travel of said pads to strip shells from the pads and position them in the pockets of said dial.

24. A combination defined in claim 23 wherein said horizontal blade lies on the side of said drum which is away from the axis of said dial and has the surface thereof which faces the dial axis curved to urge shells radially inwardly of the dial pockets.

References Cited in the file of this patent

UNITED STATES PATENTS

| | | |
|---|---|---|
| 1,130,898 | Havener | Mar. 9, 1915 |
| 1,574,913 | McManus | Mar. 2, 1926 |
| 1,745,589 | Smith | Feb. 4, 1930 |
| 1,768,605 | Johnson | July 1, 1930 |
| 1,852,578 | Johnson | Apr. 5, 1932 |
| 1,858,695 | Weisenburg | May 17, 1932 |
| 1,875,010 | Johnson | Aug. 30, 1932 |
| 1,931,294 | Nagy | Oct. 17, 1933 |
| 1,955,704 | Bahelka | Apr. 17, 1934 |
| 2,138,923 | Johnson | Dec. 6, 1938 |
| 2,348,797 | Fischer | May 16, 1944 |
| 2,442,179 | Shanklin et al. | May 25, 1948 |
| 2,481,508 | Gschwend et al. | Sept. 13, 1949 |
| 2,506,791 | Johnson et al. | May 9, 1950 |
| 2,538,887 | Smith | Jan. 23, 1951 |

FOREIGN PATENTS

| | | |
|---|---|---|
| 25,574 | Great Britain | 1912 |
| 530,347 | Great Britain | Dec. 10, 1940 |
| 108,714 | Sweden | Oct. 12, 1943 |